(12) United States Patent
Jung et al.

(10) Patent No.: US 12,245,295 B2
(45) Date of Patent: Mar. 4, 2025

(54) METHOD AND APPARATUS FOR A TWO-STEP RANDOM ACCESS PROCEDURE

(71) Applicant: Lenovo (Singapore) Pte. Ltd., New Tech Park (SG)

(72) Inventors: Hyejung Jung, Northbrook, IL (US); Joachim Löhr, Wiesbaden (DE); Vijay Nangia, Woodridge, IL (US); Prateek Basu Mallick, Dreieich (DE); Ravi Kuchibhotla, Chicago, IL (US); Alexander Johann Maria Golitschek Edler von Elbwart, Darmstadt (DE); Robert T. Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 234 days.

(21) Appl. No.: 17/764,182

(22) PCT Filed: Oct. 5, 2020

(86) PCT No.: PCT/IB2020/059310
§ 371 (c)(1),
(2) Date: Mar. 26, 2022

(87) PCT Pub. No.: WO2021/064707
PCT Pub. Date: Apr. 8, 2021

(65) Prior Publication Data
US 2022/0377812 A1    Nov. 24, 2022

Related U.S. Application Data

(60) Provisional application No. 62/911,197, filed on Oct. 4, 2019.

(51) Int. Cl.
*H04W 74/08* (2024.01)
*H04L 1/00* (2006.01)
(Continued)

(52) U.S. Cl.
CPC ....... *H04W 74/0841* (2013.01); *H04L 1/0061* (2013.01); *H04L 1/1812* (2013.01);
(Continued)

(58) Field of Classification Search
CPC .......... H04W 74/0841; H04W 52/242; H04W 52/325; H04W 52/367; H04W 74/008; H04L 1/0061
See application file for complete search history.

(56) References Cited

U.S. PATENT DOCUMENTS

| | | | |
|---|---|---|---|
| 2018/0279186 A1 | 9/2018 | Park et al. | |
| 2018/0368169 A1 | 12/2018 | Jung et al. | |

(Continued)

FOREIGN PATENT DOCUMENTS

| | | |
|---|---|---|
| CN | 114731697 A | 10/2020 |
| CN | 114731594 A | 7/2022 |

(Continued)

OTHER PUBLICATIONS

Catt, "LS to RAN1 on RAN2 agreements related to 2-step RACH", 3GPP TSG-RAN WG2 # 107; R2-1911776, Prague, Czech Republic, Aug. 26-30, 2019.
(Continued)

*Primary Examiner* — Sulaiman Nooristany
(74) *Attorney, Agent, or Firm* — FIG. 1 Patents

(57) ABSTRACT

First transmission power can be determined (1110) for a first PRACH preamble in a 2-step random access procedure based on a first set of power control parameters. The first PRACH preamble can be transmitted (1120) in the 2-step random access procedure based on the first transmission power. A determination can be made (1130) to switch from the 2-step random access procedure to a 4-step random access procedure. Second transmission power can be determined (1140) based on the first set of power control param-
(Continued)

eters and a second set of power control parameters for a subsequent second PRACH preamble transmission for the 4-step random access procedure. The subsequent second PRACH preamble can be transmitted (1150) in the 4-step random access procedure based on the second transmission power.

20 Claims, 11 Drawing Sheets

(51) Int. Cl.
| | |
|---|---|
| H04L 1/1812 | (2023.01) |
| H04W 24/08 | (2009.01) |
| H04W 52/24 | (2009.01) |
| H04W 52/32 | (2009.01) |
| H04W 52/36 | (2009.01) |
| H04W 74/00 | (2009.01) |
| H04W 74/0833 | (2024.01) |

(52) U.S. Cl.
CPC ......... *H04W 24/08* (2013.01); *H04W 52/242* (2013.01); *H04W 52/325* (2013.01); *H04W 52/367* (2013.01); *H04W 74/002* (2013.01); *H04W 74/006* (2013.01); *H04W 74/0833* (2013.01)

(56) References Cited

U.S. PATENT DOCUMENTS

| | | | |
|---|---|---|---|
| 2019/0053313 | A1 | 2/2019 | Zhou et al. |
| 2019/0313437 | A1 | 10/2019 | Jung et al. |
| 2020/0008244 | A1 | 1/2020 | Suzuki et al. |
| 2020/0252974 | A1 | 8/2020 | Akkarakaran et al. |
| 2020/0260341 | A1 | 8/2020 | Jang et al. |
| 2022/0225428 | A1 | 7/2022 | Xiong et al. |
| 2022/0264659 | A1 | 8/2022 | Enbuske et al. |
| 2022/0295574 | A1 | 9/2022 | Lin et al. |
| 2022/0369376 | A1 | 11/2022 | Lin et al. |
| 2022/0377812 | A1 | 11/2022 | Jung et al. |
| 2022/0386387 | A1 | 12/2022 | Jung et al. |
| 2022/0386388 | A1 | 12/2022 | Jung et al. |
| 2023/0007700 | A1* | 1/2023 | Saha ................. H04W 74/0833 |

FOREIGN PATENT DOCUMENTS

| | | |
|---|---|---|
| EP | 3570624 A1 | 11/2019 |
| KR | 20220079548 A | 6/2022 |
| WO | 2018085726 A1 | 5/2018 |
| WO | 2018131538 A1 | 7/2018 |
| WO | 2018151230 A1 | 8/2018 |
| WO | 2019028881 A1 | 2/2019 |
| WO | 2021064706 A1 | 4/2021 |
| WO | 2021064707 A1 | 4/2021 |
| WO | 2021064709 A1 | 4/2021 |

OTHER PUBLICATIONS

3GPP, "LS on overall procedure for 2-step RACH", 3GPP TSG-RAN WG2 #106; R2-1908481, Reno, Nevada, USA, May 13-17, 2019.
Nokia, "On 2-step RACH Procedure", 3GPP TSG-RAN WG2 #98; R1-1908342, Prague, Czech Republic, Aug. 26-30, 2019.
PCT International Search Report for PCT/IB2020/059309, Hyejung Jung, mailing date—Jan. 25, 2021.
PCT International Search Report for PCT/IB2020/059312, Hyejung Jung, mailing date—Jan. 21, 2021.
Mattis, Notice of References Cited, PTO-892, U.S. Appl. No. 15/764,181, U.S. Patent and Trademark Office, Jul. 1, 2024.
Gavin Alarcon, European Office Action, EP Patent Application No. 20792731.0-1215, European Patent Office, Jul. 8, 2024.
3GPP TS 38.321 V15.7.0 (Sep. 2019), 3rd Generation Partnership Project; Technical Specification Group Radio Access Network; NR; Medium Access Control (MAC) Protocol Specification (Release 15).
ZTE et al., "On the remaining issues of 2-step RACH procedures", R1-1908182, for 3GPP TSG-RAN WG1 Meeting #98, Prague, CZ, Aug. 26-30, 2019.
Sony, "Discussion on Procedure for 2-step RACH", R1-1908763, for 3GPP TSG-RAN WG1 Meeting #98, Prague, CZ, Aug. 26-30, 2019.
Qualcomm Incorporated, "Procedures for 2-step RACH", R1-1909240, for 3GPP TSG-RAN WG1 Meeting #98, Prague, CZ, Aug. 26-30, 2019.
Spreadtrum Communications, "Discussion on 2-step RACH procedure", R1-1910016, for 3GPP TSG-RAN WG1 Meeting #98Bis, Chongqing, China, Oct. 14-20, 2019.
InterDigital, "2-step RACH Procedure", R2-1814008, for 3GPP TSG-RAN WG2 Meeting #103bis, Chengdu, China, Oct. 8-12, 2018.
Huawei et al., "Discussion on mobility in connected mode for NR-U", R2-1816611, for 3GPP TSG-RAN WG2 Meeting #104, Spokane, USA, Dec. 12-16, 2018.
Qualcomm Incorporated, "Further details on RACH for NR-U", R2-1818503, for 3GPP TSG-RAN2 Meeting #104, Spokane, WA, USA, Nov. 12-16, 2018.
NEC, "Details on fallback mechanisms", R2-1909147, for 3GPP TSG-RAN WG2 #107, Prague, Czech Republic, Aug. 26-30, 2019.
Intel Corporation, "Further consideration of MsgB contents and procedure when CCCH SDU is included in MsgA", R2-1910378, for 3GPP TSG RAN WG2 #107, Prague, Czech Republic, Aug. 20-23, 2019.
Ericsson, "2-step RA 38.331 Draft CR", Tdoc R2-1912683, for 3GPP TSG-RAN WG2 Meeting #107bis, Chongqing, P. R. China, Oct. 14-18, 2019.
ZTE Corporation et al., "Support of CFRA with 2-step RACH", R2-1913368, for 3GPP TSG-RAN2 WG2 Meeting #107-bis, Chongqing, China, Oct. 14-18, 2019.
LG Electronics Inc., "Further clarifications on parameters for Random Access procedure", R2-2003666, for 3GPP TSG-RAN WG2 Meeting #109bis-e, Apr. 20-30, 2020.
U.S. Appl. No. 17/764,183 , "Non-Final Office Action", U.S. Appl. No. 17/764,183, Aug. 6, 2024, 27 pages.
202080067309 , "Foreign Office Action", CN Application No. 202080067309, May 31, 2024, 12 pages.
20792732.8 , "Foreign Office Action", EP Application No. 20792732.8, Jul. 11, 2024, 12 pages.
Motorola Mobility , et al., "2-step RACH procedure", 3GPP TSG RAN WG1 #98bis, R1-1911035, Chongqing, China, Oct. 2019, 6 pages.
PCT/IB2020/059310 , "International Search Report", PCT Application No. PCT/IB2020/059310, Jan. 22, 2021, 4 pages.
U.S. Appl. No. 17/764,181 , "Corrected Notice of Allowance", U.S. Appl. No. 17/764,181, Dec. 20, 2024, 5 pages.
U.S. Appl. No. 17/764,181 , "Notice of Allowance", U.S. Appl. No. 17/764,181, Dec. 18, 2024, 9 pages.
202080067309.6 , "Foreign Office Action", CN Application No. 202080067309.6, Oct. 11, 2024, 20 pages.
202080067314.7 , "Foreign Office Action", CN Application No. 202080067314.7, Oct. 11, 2024, 15 pages.
Jung, Hyejung , et al., "Pursuant to MPEP § 2001.06(b) the applicant brings the following application to the Examiner's attention:", U.S. Appl. No. 62/911,197, Oct. 4, 2019, 35 pages.

* cited by examiner

METHOD AND APPARATUS FOR A TWO-STEP RANDOM ACCESS PROCEDURE

BACKGROUND

1. Field

The present disclosure is directed to a method and apparatus for a two-step random access procedure.

2. Introduction

Presently, wireless communication devices, such as User Equipment (UE), communicate with other communication devices using wireless signals. A random access procedure is used by a UE to synchronize with a wireless network so the UE can transmit and receive data on the wireless network.

A 2-step random access procedure includes MsgA transmission from the UE and MsgB reception by the UE. The 2-step random access procedure can reduce latency related to connection set-up, a serving cell change (e.g. handover), and/or uplink synchronization, and potentially has benefits for channel access in unlicensed spectrum when compared to a 4-step random access procedure. MsgA includes a Physical Random Access Channel (PRACH) preamble and a Physical Uplink Shared Channel (PUSCH) with data that can also be included in Msg3 of a 4-step random access procedure. MsgB includes at least a Random Access Response (RAR) message.

A 4-step random access procedure includes the transmission of random access preamble (Msg1) in a PRACH, reception of RAR message with a Physical Downlink Control Channel (PDCCH)/Physical Downlink Shared Channel (PDSCH) (Msg2), and, when applicable, the transmission of a PUSCH scheduled by a RAR Uplink (UL) grant, and reception of PDSCH for contention resolution.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
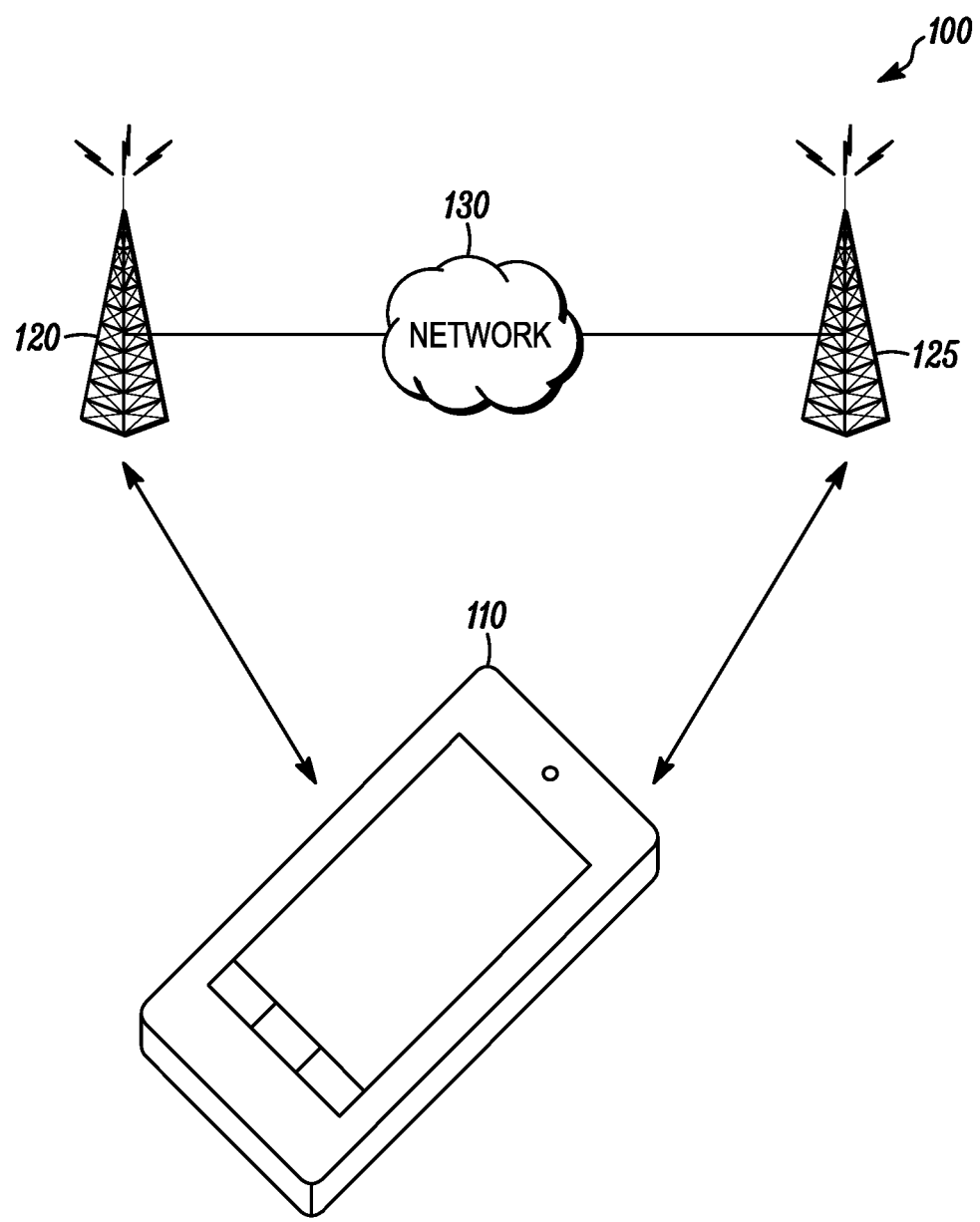
FIG. 1 is an example block diagram of a system according to a possible embodiment.

Embodiments provide a method and apparatus for a two-step random access procedure.

According to a possible embodiment, a command can be received from a network entity. The command can initiate a random access procedure and can include information of a type of random access procedure. The type of random access procedure can be selected from a 2-step random access procedure and a 4-step random access procedure. A MsgA transmission can be transmitted in response to receiving the command when the type of random access procedure is the 2-step random access procedure.

According to a possible embodiment, first transmission power can be determined for a first PRACH preamble in a 2-step random access procedure based on a first set of power control parameters. The first PRACH preamble can be transmitted in the 2-step random access procedure based on the first transmission power. A determination can be made to switch from the 2-step random access procedure to a 4-step random access procedure. Second transmission power can be determined based on the first set of power control parameters and a second set of power control parameters for a subsequent second PRACH preamble transmission for the 4-step random access procedure. The subsequent second PRACH preamble can be transmitted in the 4-step random access procedure based on the second transmission power.

According to a possible embodiment, at least one common PUCCH resource set configuration can be received for a 2-step random access procedure. At least one common PUCCH resource set can be determined based on the at least one common PUCCH resource set configuration. A PRACH and a corresponding MsgA PUSCH can be transmitted. A MsgB PDSCH can be received in response to the transmitted PRACH and MsgA PUSCH. The received MsgB PDSCH can be decoded. A successRAR intended to the UE can be identified from the decoded MsgB PDSCH. A common PUCCH resource set of the at least one common PUCCH resource set and a PUCCH resource of the common PUCCH resource set can be determined based on the successRAR. At least HARQ-ACK feedback information for the MsgB PDSCH can be transmitted on the PUCCH resource.

Embodiments can provide methods for MsgB structure and transmission/reception of MsgB, HARQ-ACK feedback for MsgB successRAR, 2-step random access procedure initiated by a network command, search space configuration for MsgB, and/or power control when a UE fallbacks from a 2-step random access procedure to a 4-step random access operation.

Embodiments can provide details on PUCCH resource/HARQ-ACK feedback timing indication for MsgB HARQ-ACK feedback. Multiple common PUCCH resource set configurations can be received for 2-step RACH. A common PUCCH resource set can be selected depending on whether to include CSI report or not and depending on which type of CSI report is included in a PUCCH resource for MsgB HARQ-ACK feedback. A UE-specific PDSCH-to-HARQ-ACK feedback timing offset can be applied to determine HARQ-ACK feedback timing.

Embodiments can provide for enabling/disabling of support of UE's HARQ combining for MsgB.

Embodiments can provide for RACH initiated by a network command (e.g. handover command or PDCCH order). An indication of a random access procedure type (i.e. 2-step RACH vs 4-step RACH) can be received. A CSI request can be received in the network command along with indication of a 2-step random access procedure. If UE is indicated to perform a 2-step random access procedure during a SpCell change, the UE can use an indicated new UE identity ('newUE-Identity') to send a UE identity in MsgA PUSCH (e.g. for contention-based 2-step RACH) and to monitor a PDCCH for reception of MsgB in response to MsgA PUSCH transmission (e.g. monitor a DCI format with CRC scrambled with the new UE identity).

Embodiments can provide details on PDCCH monitoring for MsgB. If the UE has C-RNTI, the UE can be configured with two PDCCH search space sets (MsgB-SearchSpaceCommon, MsgB-SearchSpace) for MsgB PDCCH. The UE can be configured with two different MsgB windows. A first MsgB window can be associated with a first PDCCH search space set (e.g. CSS). A second MsgB window can be associated with a second PDCCH search space set (e.g. USS). For example, the first MsgB window can be configured with a longer duration than the second MsgB window to accommodate multiple MsgB PDSCHs with different MAC PDUs within the first MsgB window. With successful completion of 2-step RACH, if the UE has not been provided other UE-specific search space sets, the UE can monitor PDCCH candidates for fallback/compact DCI formats with CRC scrambled by C-RNTI in the second PDCCH search space set provided by MsgB-SearchSpace.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

The following provides RAN2 agreements related to 2-step random access procedure:

Agreements based on 3GPP document R2-1908481:
1. From RAN2 perspective, 2-step Random Access Channel (RACH) selections can be based on indicating to all UEs via System Information Block (SIB), or dedicated configuration in RRC CONNECTED/INACTIVE/IDLE states. For Further Study (FFS) if radio quality is used for 2-step RACH selection.
2. From RAN2 perspective, for MsgA retransmission (i.e. preamble and PUSCH) we assume that the UE retries on 2-step RACH.
3. FFS whether the UE can fallback to 4-step RACH after certain time. Ask RAN1 whether the preamble transmission performance for 2-step RACH and 4-step RACH is the same.
4. For MsgA with Cell-Radio Network Temporary Identifier (C-RNTI), the UE shall monitor the PDCCH addressed to C-RNTI for success response and MsgB-RNTI (e.g. Random Access-Radio Network Temporary Identifier (RA-RNTI) or new RNTI).
5. Contention resolution:
   a. If the PDU PDCCH addressed to the C-RNTI (i.e. C-RNTI included in MsgA) containing the 12-bit Timing Advance (TA) command is received, the UE should consider the contention resolution to be successful and stop the reception of MsgB or with UL grant if the UE is synchronized already.
   b. If the corresponding fallback RAR is detected, the UE should stop the monitoring of PDCCH addressed to the corresponding C-RNTI for success response and process the fallback operation accordingly.
   c. If neither corresponding fallback RAR nor PDCCH addressed C-RNTI is detected within the response window, the UE should consider the MsgA attempt failed and do back off operation based on the backoff indicator if received in MsgB.
   d. FFS if a new Medium Access Control (MAC) Control Element (CE) with 12 bits Timing Advanced Command shall be introduced
6. For Common Control Channel (CCCH), MsgB can include the Signalling Radio Bearer (SRB) Radio Resource Control (RRC) message. The format should be designed for both with and without RRC message.

7. For CCCH, for success or fallback RAR MsgB can multiplex messages for multiple UEs. FFS if we can multiplex SRB RRC messages of multiple UEs.
8. Network response to MsgA (i.e. MsgB/Msg2) can include the following:
   a. SuccessRAR
   b. FallbackRAR
   c. Backoff Indication.
   FFS: format of successRAR and whether successRAR is split into more than one message and format of fallbackRAR and whether legacy msg2 can be reused for fallbackRAR.
9. The following fields can be included in the successRAR when CCCH message is included in msgA.
   a. Contention resolution Identifier (ID)
   b. C-RNTI
   c. TA command.
10. Upon receiving the fallbackRAR, the UE shall proceed to Msg3 step of 4-step RACH procedure
11. FallbackRAR should contain the following fields
    a. RAPID
    b. UL grant (to retransmit the MsgA payload). FFS on restrictions on the grant and UE behavior if different grant and rebuilding
    c. Temporary Cell RNTI (TC-RNTI)
    d. TA command.
12. From RAN2 perspective, no further offset is needed for the start of MsgB monitoring window (i.e. no offset is needed to cover the RRC processing delay and/or F1 delay).
13. The UE will monitor for response message using the single msgB agreed window.
14. MsgB containing the succcessRAR shall not be multiplexed with the legacy 4-step RACH RAR in the same MAC PDU.

Agreements based on 3GPP document R2-1911776:
1. Working assumption: SRB RRC messages of multiple UEs cannot be multiplexed in same MsgB (i.e. same MAC PDU).
2. successRAR cannot be split into more than one message (i.e.Contention resolution ID will also be included in successRAR).
3. SuccessRAR and fallbackRAR can be multiplexed and
   ⇒ HARQ feedback for msgB would be needed from RAN2 point of view and
4. TB size offered in UL grant in the fallback RAR shall be the same as the TB size offered for payload transmission in MsgA; otherwise, the UE behavior is not defined (i.e. it is up to UE implementation).

In 4-step random access procedures, it is less likely that all or a majority of UEs that transmitted PRACH preambles on a given PRACH occasion transmit HARQ-ACK feedback on a same slot in response to reception of its own Msg4 PDSCH, since each UE may go through a different number of retransmissions for Msg3 PUSCH and/or a network entity can adjust transmission timing of Msg4 PDSCH (addressed to UE's TC-RNTI) based on its scheduling decision. Thus, 16 PUCCH resources in a common (e.g. cell-specifically configured) PUCCH resource set may be enough to accommodate HARQ-ACK feedback from UEs performing 4-step random access procedures. However, in 2-step random access procedures, a group of UEs that transmitted PRACH preambles and corresponding MsgA PUSCHs on a given PRACH occasion and MsgA PUSCH occasion may receive successRARs in a same MsgB PDSCH and may have to provide HARQ-ACK feedback. Thus, it may be necessary to allow the network entity to indicate different values for a PDSCH-to-HARQ feedback timing indicator for different intended UEs of the MsgB PDSCH. Furthermore, UE's Downlink (DL) Channel State Information (CSI) acquisition and reporting during the 2-step random access procedures can be used if the network entity has DL data for the UE and subsequent DL transmissions to the UE are expected.

According to Sub clause 9.2.1 of 3GPP TS 38.213 V15.6.0 (2019-06), if a UE does not have dedicated PUCCH resource configuration, provided by PUCCH-ResourceSet in PUCCH-Config, a PUCCH resource set is provided by pucch-ResourceCommon through an index to a row of Table 9.2.1-1 for transmission of HARQ-ACK information on PUCCH in an initial UL Bandwidth Part (BWP) of $N_{BWP}^{size}$ Physical Resource Blocks (PRBs). The PUCCH resource set includes sixteen resources, each corresponding to a PUCCH format, a first symbol, a duration, a PRB offset $RB_{BWP}^{offset}$ and a cyclic shift index set for a PUCCH transmission. The UE transmits a PUCCH using frequency hopping. An orthogonal cover code with index 0 is used for a PUCCH resource with PUCCH format 1 in Table 9.2.1-1. The UE transmits the PUCCH using the same spatial domain transmission filter as for a PUSCH transmission scheduled by a RAR UL grant as described in Subclause 8.3.

If a UE is not provided pdsch-HARQ-ACK-Codebook, the UE generates at most one HARQ-ACK information bit.

If the UE provides HARQ-ACK information in a PUCCH transmission in response to detecting a Downlink Control Information (DCI) format 1_0 or DCI format 1_1, the UE determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of Control Channel Elements (CCEs) in a Control Resource Set (CORESET) of a PDCCH reception with DCI format 1_0 or DCI format 1_1, as described in Subclause 10.1, $n_{CCE,0}$ is the index of a first CCE for the PDCCH reception, and $\Delta_{PRI}$ is a value of the PRI field in the DCI format 1_0 or DCI format 1_1.

If $\lfloor r_{PUCCH}/8 \rfloor = 0$, then the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes; and the UE determines the initial cyclic shift index in the set of initial cyclic shift indexes as $r_{PUCCH}$ mod $N_{CS}$.

If $\lfloor r_{PUCCH}/8 \rfloor = 0$, then the UE determines the PRB index of the PUCCH transmission in the first hop as $N_{BWP}^{size} - 1 - RB_{BWP}^{offset} - \lfloor (r_{PUCCH} - 8)/N_{CS} \rfloor$; and the PRB index of the PUCCH transmission in the second hop as $RB_{BWP}^{offset} + \lfloor (r_{PUCCH} - 8)/N_{CS} \rfloor$; and the UE determines the initial cyclic shift index in the set of initial cyclic shift indexes as $(r_{PUCCH} - 8)$ mod $N_{CS}$.

TABLE 9.2.1-1

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |

TABLE 9.2.1-1-continued

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The 3GPP Tdoc R1-1908342 provides various ways to uniquely determine a PUCCH resource when several UEs have data in a groupcast MsgB:

1. DCI field is expanded to include multiple PUCCH resource indicators and/or PDSCH-to-HARQ_feedback timing indicator, one for each UE having its contention resolution identity in MsgB. While, this scheme seems straight forward to design, it increases the size of the DCI, and based on the size constraints of the DCI there is an upper limit on the number of UEs whose contention resolution identity can be placed in MsgB.

2. The DCI field provides the PUCCH resource indicator and PDSCH-to-HARQ_feedback timing indicator of the first UE with contention resolution identity in MsgB. If there are other UEs with contention resolution identity in MsgB, the PUCCH resource indicator and PDSCH-to-HARQ_feedback timing indicator are provided inside MsgB. This scheme doesn't increase the size of the DCI but increases the size of MsgB.

3. The PUCCH resource is derived implicitly depending on the UE's contention resolution identity position within MsgB as well as parameters related to the DCI scheduling MsgB (e.g. the starting CCE index of MsgB's DCI, PUCCH resource indicator and/or PDSCH-to-HARQ_feedback timing, and higher layer parameters). This scheme doesn't increase the size of the DCI scheduling MsgB or the size of MsgB.

According to Sub clause 8.1 of 3GPP TS 38.213, a configuration by higher layers for a PRACH transmission includes the following: A configuration for PRACH transmission described in TS 38.211; and a preamble index, a preamble Subcarrier Spacing (SCS), $P_{PRACH,target}$ a corresponding RA-RNTI, and a PRACH resource.

A PRACH is transmitted using the selected PRACH format with transmission power $P_{PRACH,b,f,c}(i)$, as described in Subclause 7.4, on the indicated PRACH resource.

A UE is provided a number N of Synchronization Signal (SS)/Physical Broadcast Channel (PBCH) blocks associated with one PRACH occasion and a number R of contention-based preambles per SS/PBCH block per valid PRACH occasion by ssb-perRACH-OccasionAndCB-Preambles-PerSSB. If N<1, one SS/PBCH block is mapped to 1/N consecutive valid PRACH occasions and R contention based preambles with consecutive indexes associated with the SS/PBCH block per valid PRACH occasion start from preamble index 0. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by totalNumberOfRA-Preambles and is an integer multiple of N. N can be a fraction.

SS/PBCH block indexes provided by ssb-PositionsIn-Burst in SIB1 or in ServingCellConfigCommon are mapped to valid PRACH occasions in the following order where the parameters are described in Subclause 4 of TS 38.211: First, in increasing order of preamble indexes within a single PRACH occasion; second, in increasing order of frequency resource indexes for frequency multiplexed PRACH occasions; third, in increasing order of time resource indexes for time multiplexed PRACH occasions within a PRACH slot; and fourth, in increasing order of indexes for PRACH slots.

An association period, starting from frame 0, for mapping SS/PBCH blocks to PRACH occasions is the smallest value in the set determined by the PRACH configuration period according to Table 8.1-1 such that $N_{Tx}^{SSB}$ SS/PBCH blocks are mapped at least once to the PRACH occasions within the association period, where a UE obtains $N_{Tx}^{SSB}$ from the value of ssb-PositionsInBurst in SIB1 or in ServingCellConfigCommon. If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

For a PRACH transmission triggered by a PDCCH order, if the value of the random access preamble index field is not zero, the PRACH mask index field described in subclause 5 of TS 38.212 indicates the PRACH occasion for the PRACH transmission where the PRACH occasions are associated with the SS/PBCH block index indicated by the SS/PBCH block index field of the PDCCH order. The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects, for a PRACH transmission, the PRACH occasion indicated by PRACH mask index value for the indicated SS/PBCH block index in the first available mapping cycle.

For the indicated preamble index, the ordering of the PRACH occasions is: first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

For a PRACH transmission triggered upon request by higher layers, a value of ra-OccasionList described in subclause 12 of TS 38.331, if the value of the random access preamble index field is not zero, indicates a list of PRACH occasions for the PRACH transmission where the PRACH occasions are associated with a CSI-Reference Signal (RS) index indicated by csi-RS. The indexing of the PRACH occasions indicated by ra-OccasionList is reset per association pattern period.

TABLE 8.1-1

Mapping between PRACH configuration period and SS/PBCH block to PRACH occasion association period

| PRACH config-uration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

For paired spectrum all PRACH occasions are valid. For unpaired spectrum, if a UE is not provided TDD-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 8.1-2.

If a UE is provided TDD-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block transmission symbol, where $N_{gap}$ is provided in Table 8.1-2 for preamble format B4 described in subclause 4 of TS 38.211, $N_{gap}=0$.

TABLE 8.1-2

$N_{gap}$ values for different preamble SCS μ

| Preamble SCS | $N_{gap}$ |
|---|---|
| 1.25 kHz or 5 kHz | 0 |
| 15 kHz or 30 kHz or 60 kHz or 120 kHz | 2 |

At least some embodiments can provide MsgB structure and HARQ-ACK feedback for MsgB. In one implementation, a UE can be expected to provide HARQ-ACK feedback of MsgB during 2-step random access procedure for the following cases. In a first case, the UE can be expected to provide HARQ-ACK feedback in response to detecting a DCI format addressed to C-RNTI that schedules a unicast MsgB PDSCH, if the UE includes the C-RNTI in MsgA and/or performs contention-free 2-step random access procedure. In a second case, the UE can be expected to provide HARQ-ACK feedback in response to detecting a DCI format addressed to MsgB-RNTI and finding its contention resolution identity from one of successRARs in MsgB PDSCH, if the UE includes CCCH Service Data Unit (SDU) in MsgA.

For the first case above, the UE can send ACK or Negative ACK (NACK), depending on success or failure of decoding of MsgB PDSCH. For the second case above, the UE can send ACK only.

In one embodiment, a UE can receive one or more common PUCCH resource configurations for a 2-step random access procedure and can determine one or more sets of common PUCCH resources configured for the 2-step random access procedure based on the one or more common PUCCH resource configurations. In one implementation, the one or more sets of common PUCCH resources configured for the 2-step random access procedure can be different from a set of common PUCCH resources configured for a 4-step random access procedure. In another implementation, a set of common PUCCH resources from the one or more sets of common PUCCH resources can be used both for 2-step and 4-step random access procedures, where the UE can send one HARQ-ACK bit in a PUCCH resource of the set of common PUCCH resources. The different sets of common PUCCH resources can have different PUCCH formats to accommodate different number of Uplink Control Information (UCI) bits that result from different types of UCI. For example, the different types of UCI can include 1-bit HARQ-ACK information only, HARQ-ACK information and CSI report 1 (e.g. report quantity set to 'ssb-Index-RSRP' indicating to include SS/PBCH block indices and corresponding RSRP values), and HARQ-ACK and CSI report 2 (e.g. report quantity set to 'deltaCQI' indicating to include differential Channel Quality Indicator (CQI) information with respect to CQI/Modulation and Coding Scheme (MCS) used for the MsgB PDSCH).

In one example of PUCCH formats 1 and 2, a common PUCCH resource configuration can include information of a PUCCH format (e.g. specified in 3GPP TS 38.213), a first symbol (i.e. starting symbol) of a PUCCH transmission, a number of symbols for the PUCCH transmission, PRB offset, and a set of initial cyclic shift indices. In another example of PUCCH formats 2 and 3, the common PUCCH resource configuration can include information of a starting PRB (or PRB offset), a number of PRBs, a number of symbols for a PUCCH transmission, and a first symbol for the PUCCH transmission. In yet another example of PUCCH format 4, the common PUCCH resource configuration can include PRB offset, a number of symbols for a PUCCH transmission, a length for an orthogonal cover code, and a first symbol for the PUCCH transmission.

According to one embodiment, a UE can receive one or more cell-specific CSI report configurations and associated one or more common PUCCH resource configurations, and can receive an indication of whether to include a CSI report and/or which type of CSI report to include in a PUCCH resource carrying HARQ-ACK information of MsgB PDSCH from a MsgB successRAR intended to the UE. Based on the indication, the UE can determine a proper common PUCCH resource set for use, and can further identify a PUCCH resource from the determined common PUCCH resource set based on explicit and/or implicit PUCCH resource indication (e.g. combination of PRI and a starting CCE index of MsgB DCI).

According to another embodiment, a UE can determine PDSCH-to-HARQ-ACK feedback timing for HARQ-ACK feedback in response to a successfully received successRAR in MsgB PDSCH, based on 1) information in a PDSCH-to-HARQ-ACK feedback timing indicator field of DCI scheduling the MsgB PDSCH and 2) PDSCH-to-HARQ-ACK feedback timing offset explicitly and/or implicitly indicated in a MAC subPDU intended to the UE.

Figure 2:
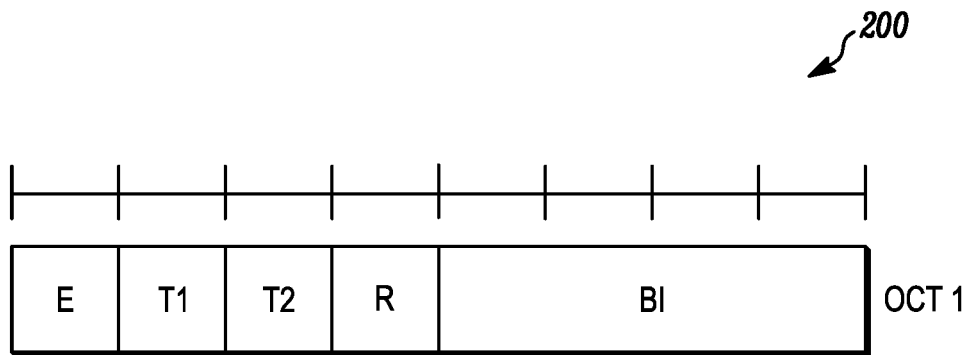
FIG. 2 is an example illustration of a Medium Access Control (MAC) subheader with Backoff Indicator (BI) for an example MAC sub-Protocol Data Unit (PDU) for MsgB according to a possible embodiment.
Figure 3:
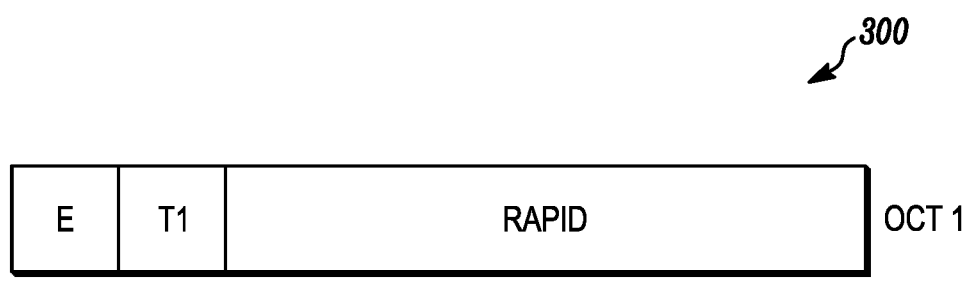
FIG. 3 is an example illustration of a MAC subheader with Random Access Preamble Identifier (RAPID) for fallbackRAR for an example MAC subPDU for MsgB according to a possible embodiment.
Figure 4:
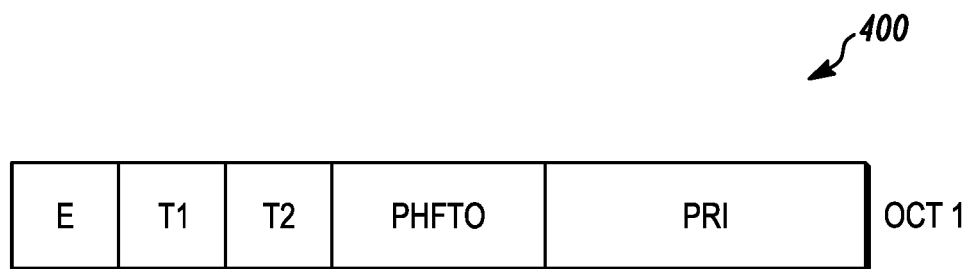
FIG. 4 is an example illustration of a MAC subheader with PDSCH-to-Hybrid Automatic Repeat Request (HARQ)-Acknowledgement (ACK) Feedback Timing Offset (PHFTO)/Physical Uplink Control Channel (PUCCH) Resource Indicator (PRI) for successRAR for an example MAC subPDU for MsgB according to a possible embodiment.
Figure 5:
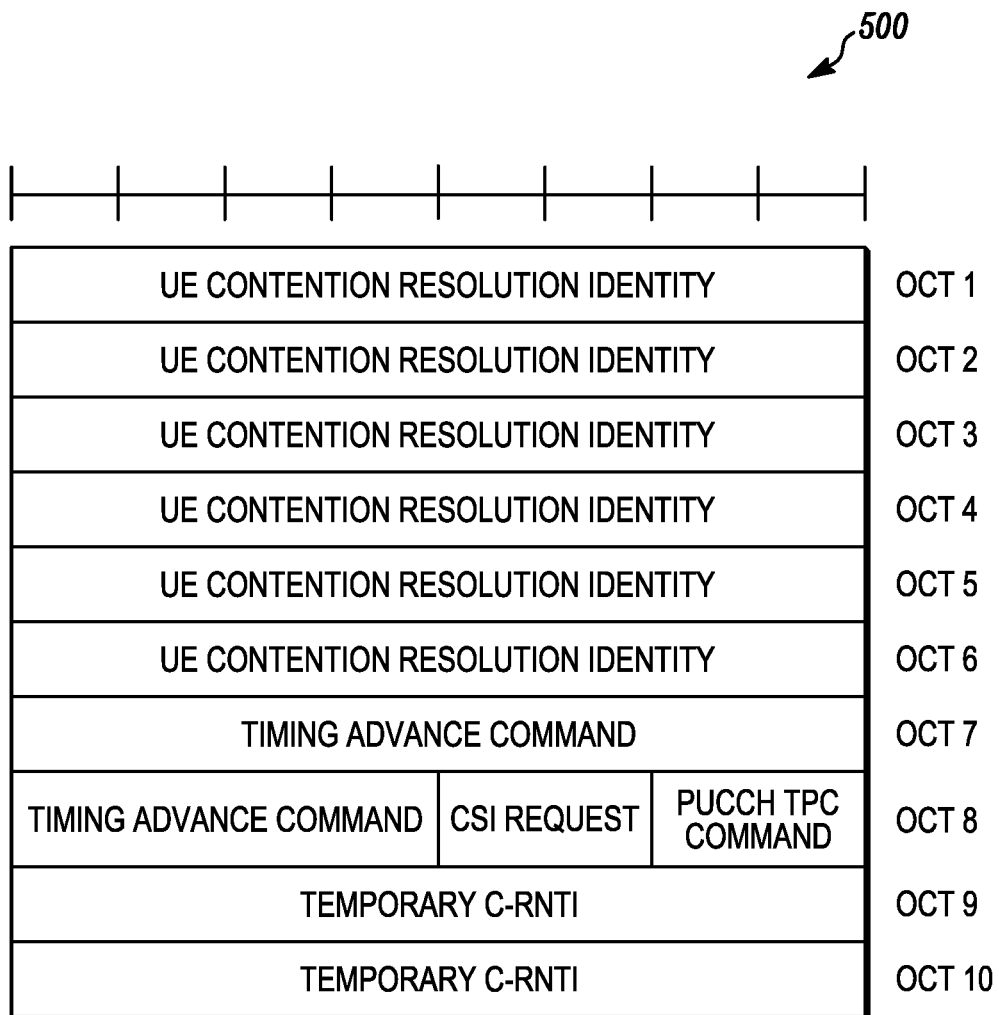
FIG. 5 is an example illustration of a MAC successRAR for an example MAC subPDU for MsgB according to a possible embodiment.

FIG. 2 is an example illustration 200 of a MAC subheader with BI for an example MAC subPDU for MsgB according to a possible embodiment. FIG. 3 is an example illustration 300 of a MAC subheader with RAPID for fallbackRAR for an example MAC subPDU for MsgB according to a possible embodiment. FIG. 4 is an example illustration 400 of a MAC subheader with PHFTO/PRI for successRAR for an example MAC subPDU for MsgB according to a possible embodiment. FIG. 5 is an example illustration 500 of a MAC successRAR for an example MAC subPDU for MsgB according to a possible embodiment.

A MAC PDU for MsgB PDSCH can include of one or more MAC subPDUs and optionally padding. Each MAC subPDU can include one of the following: a MAC subheader with BI only; a MAC subheader with RAPID and MAC fallbackRAR; or a MAC subheader with PHFTO/PRI and MAC successRAR.

In a MAC subheader, 'T1' can indicate a MAC subheader type, where 'T1' set to 0 can indicate a MAC subheader with RAPID and 'T1' set to 1 can indicate MAC subheader with BI only or MAC subheader with PHFTO/PRI. In addition, 'T2' can also indicate a MAC subheader type, where 'T2' set to 0 can indicate MAC subheader with BI only and 'T2' set to 1 can indicate a MAC subheader with PHFTO/PRI. 'E' can be an extension flag that can indicate if the MAC subPDU including this MAC subheader is the last MAC subPDU or not in the MAC PDU. The E field can be set to 1 to indicate at least another MAC subPDU follows. The E field is set to 0 to indicate that the MAC subPDU including this MAC subheader is the last MAC subPDU in the MAC PDU. 'It' can indicate a reserved bit, set to 0.

The MAC successRAR in the illustration 500 can include a CSI request field and a Transmit Power Control (TPC) command for a scheduled PUCCH. The MAC successRAR can also include UE Contention Resolution Identities, a Timing Advance Command, and Temporary C-RNTIs. An example of the 2-bit CSI request field is defined in Table 1, and an example of the 2-bit PUCCH TPC command is defined in Subclause 7.2.1 of TS38.213. In this example, a MAC fallbackRAR can be the same as MAC RAR of 4-step random access procedure. If a UE receives a MAC subPDU including a MAC successRAR, the UE can determine PDSCH-to-HARQ-ACK feedback timing by applying an indicated PHFTO value to a value of a PDSCH-to-HARQ-ACK feedback timing indicator in DCI.

TABLE 1

Example of CSI request field

| Bit field | Random access procedure type and CSI request indicator |
|---|---|
| 00 | HARQ-ACK only (no CSI report multiplexing in PUCCH) |
| 01 | HARQ-ACK and CSI report according to a first CSI report configuration (and using a first common PUCCH resource configuration) |
| 10 | HARQ-ACK and CSI report according to a second CSI report configuration (and using a second common PUCCH resource configuration) |
| 11 | Reserved |

Figure 6:
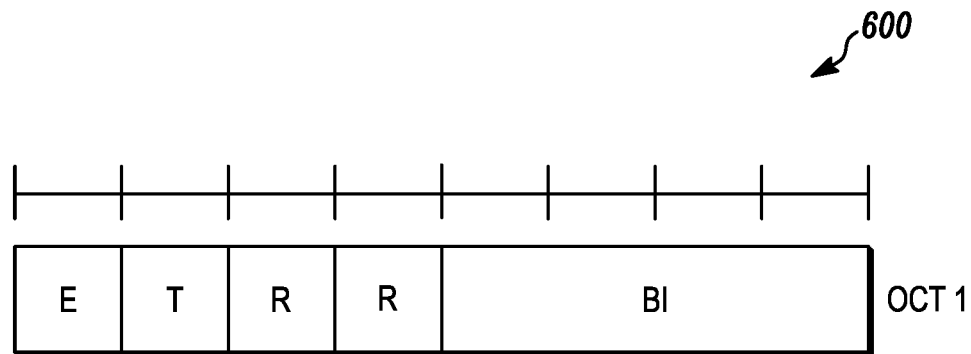
FIG. 6 is an example illustration of a MAC subheader with BI for an example MAC subPDU for MsgB according to a possible embodiment.
Figure 7:
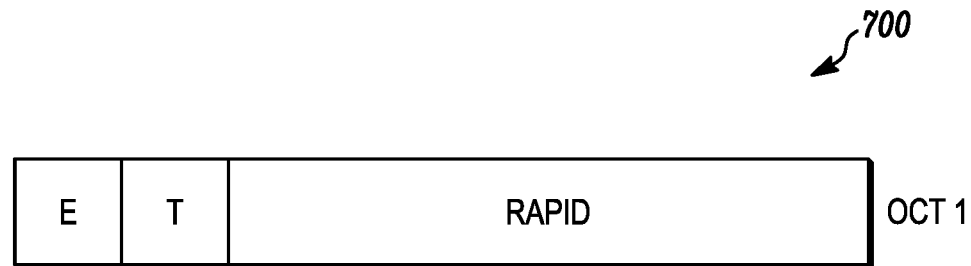
FIG. 7 is an example illustration of a MAC subheader with RAPID for fallbackRAR and successRAR for an example MAC subPDU for MsgB according to a possible embodiment.
Figure 8:
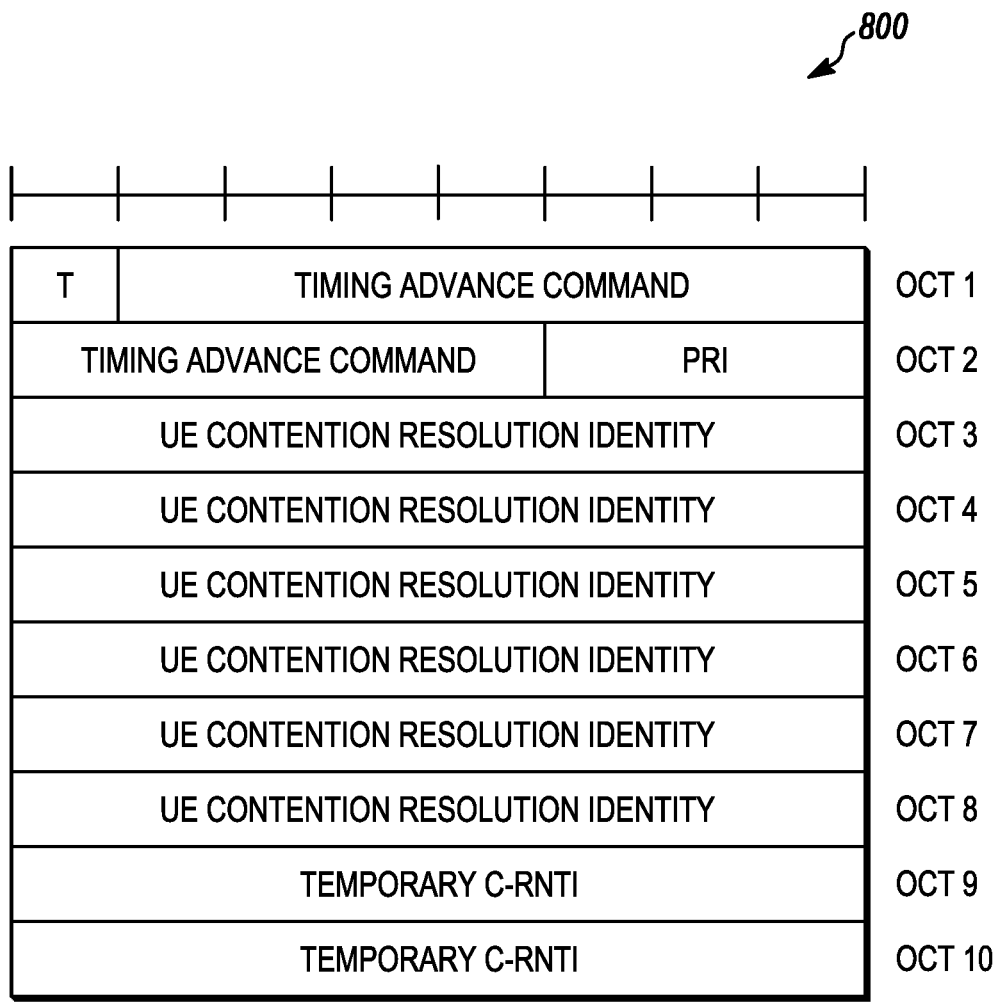
FIG. 8 is an example illustration of a MAC successRAR for an example MAC subPDU for MsgB according to a possible embodiment.

FIG. 6 is an example illustration 600 of a MAC subheader with BI for an example MAC subPDU for MsgB according to a possible embodiment. FIG. 7 is an example illustration 700 of a MAC subheader with RAPID for fallbackRAR and successRAR for an example MAC subPDU for MsgB according to a possible embodiment. FIG. 8 is an example illustration 800 of a MAC successRAR for an example MAC subPDU for MsgB according to a possible embodiment. For example, each MAC subPDU can include one of the following: a MAC subheader with BI only; a MAC subheader with RAPID and MAC fallbackRAR; or a MAC subheader with RAPID and MAC successRAR.

In this example, one common PUCCH resource set can be configured for a 2-step random access procedure. A MAC fallbackRAR can be the same as a MAC RAR of 4-step random access procedure except that the reserved 1 bit can be used to indicate the type of RAR, i.e. fallbackRAR or successRAR. A UE can receive cell-specific configuration for a set of PHFTO values, and can determine which timing offset value to apply to a value of a PDSCH-to-HARQ feedback timing indicator in DCI scheduling MsgB PDSCH, based on an order of a MAC subPDU for the UE within MAC PDU of MsgB PDSCH. For example, if the MAC subPDU intended to the UE is placed in the fifth order within the MAC PDU of MsgB PDSCH, the UE can apply the fifth timing offset value of the set of PDSCH-to-HARQ feedback timing offset values.

At least some embodiments can provide for MsgB transmission within a MsgB window. In an embodiment, a network entity can enable or disable support of UE's HARQ combining of MsgB PDSCH via higher-layer signaling, depending on deployment and/or usage scenarios (e.g. a cell size, expected average number of UEs performing 2-step random access procedures per MsgA occasion, a number of active UEs and PDCCH capacity). A UE can interpret DCI field information of a DCI format that is used to schedule MsgB PDSCH differently depending on enabling/disabling of support of HARQ combining of MsgB PDSCH.

In one example, HARQ combining of MsgB PDSCH can be disabled if an average number of UEs performing 2-step random access procedures per MsgA occasion is high. With a large number of UEs performing 2-step random access procedures per MsgA occasion, the MsgB MAC PDU size can be expected to be large. Thus, re-transmission of the same MsgB MAC PDU may not be efficient. Instead, the network entity can re-transmit successRARs for which corresponding HARQ-ACK feedback are not successfully received.

In one example, the following information is transmitted by means of the DCI format 1_0 with Cyclic Redundancy Check (CRC) scrambled by MsgB-RNTI to schedule MsgB PDSCH:

- Frequency domain resource assignment $-\lceil \log_2 (N_{RB}^{DL,BWP}(N_{RB}^{DL,BWP}+1)/2) \rceil$ bits
  $N_{RB}^{DL,BWP}$ is the size of CORESET 0 if CORESET 0 is configured for the cell and $N_{RB}^{DL,BWP}$ is the size of initial DL bandwidth part if CORESET 0 is not configured for the cell
- Time domain resource assignment—4 bits as defined in Subclause 5.1.2.1 of [TS38.214]
- VRB-to-PRB mapping—1 bit according to Table 7.3.1.2.2-5
- Modulation and coding scheme—5 bits as defined in Subclause 5.1.3 of [TS38.214], using Table 5.1.3.1-1
- TB scaling—2 bits as defined in Subclause 5.1.3.2 of [TS38.214]
- PDSCH-to-HARQ feedback timing indicator—3 bits as defined in Subclause 9.2.3 of [TS38.213]
- New data indicator—1 bit if HARQ combining of MsgB PDSCH is supported in 3GPP Rel-16 NR and enabled. Otherwise, 0 bit.
- Redundancy version—2 bits as defined in Table 7.3.1.1.1-2 if HARQ combining of MsgB PDSCH is supported in 3GPP Rel-16 NR and enabled. Otherwise, 0 bit.
- HARQ process number—4 bits if HARQ combining of MsgB PDSCH is supported in 3GPP Rel-16 NR and enabled. Otherwise, 0 bit.
- Reserved bits—6 bits if HARQ combining of MsgB PDSCH is supported in 3GPP Rel-16 NR and enabled. Otherwise, 13 bits.

At least some embodiments can provide for 2-step random access procedure initiated by a network command. According to one embodiment, if a UE receives a command initiating a random access procedure, the UE can also receive an indication of a random access procedure type (i.e. 2-step RACH vs 4-step RACH) for the initiated random access procedure. The command initiating the random access procedure can be received via a Layer-1 indication (e.g. a PDCCH order) or a higher-layer indication (e.g. a RRC parameter 'ReconfigurationWithSync').

If a 2-step based contention-free random access procedure is indicated in the command, the UE can receive information of a dedicated PRACH preamble and/or a dedicated MsgA PUSCH resource. Furthermore, the UE can receive an indication requesting a CSI report and can send the CSI report in MsgA PUSCH. The UE performing the contention-free 2-step random access procedure can be in a RRC connected mode. Since a network entity is aware of the PRACH preamble and/or the MsgA PUSCH resource assigned to the UE, the UE may not include a UE identity (e.g. C-RNTI or CCCH SDU) in the MsgA PUSCH but can include the CSI report in the MsgA PUSCH. The network entity can use the CSI report from the UE in order to schedule a UE-specific MsgB PDSCH or other PDSCHs intended to the UE with proper MCS, resource allocation (e.g. a number of PRBs, a number of symbols), and spatial settings (e.g. a TCI state(s), a number of spatial layers, a precoder(s)).

In a network initiated 2-step random access procedure, upon transmitting a PRACH preamble and MsgA PUSCH, a UE can monitor a DCI format with CRC scrambled by a UE-specific identity (e.g. C-RNTI), i.e. a PDCCH addressed to the UE-specific identity, within a MsgB window (i.e. MsgB random access response window) to receive a PDCCH scheduling a MsgB PDSCH.

In one example, a UE can perform a PDCCH-ordered 2-step or 4-step random access procedure by detecting a DCI format 1_0 with CRC scrambled by C-RNTI and with the following information. A network entity can send a PDCCH order to initiate a random access procedure, if downlink data arrives for the UE and the UE is not uplink synchronized (e.g. 'timeAlignmentTimer' has expired). In one implementation, the network entity can determine a random access procedure type (2-step RACH vs 4-step RACH) based on UE's Radio Resource Management (RRM) measurement report (e.g. Reference Signal Received Power (RSRP) measurements) and/or pathloss estimation. Along with initiation of a 2-step random access procedure, the network entity can request a CSI report. The CSI request and the random access procedure type can be jointly encoded in one bit field or separately indicated with different bit fields in DCI.

Identifier for DCI formats—1 bit
    The value of this bit field can be always set to 1, indicating a DL DCI format Frequency domain resource assignment—$\lceil \log_2(N_{RB}^{DL,BWP}(N_{RB}^{DL,BWP}+1)/2) \rceil$ bits where $N_{RB}^{DL,BWP}$ is given by subclause 7.3.1.0. All bits in this field are set to one, in order to indicate initiation of a PDCCH order based random access procedure.

Random access procedure type and CSI request indicator—X bits (e.g. X=2) if a UE is configured with both 2-step and 4-step random access configurations in a serving cell. This field can be reserved if the UE is configured with either 2-step or 4-step random access configuration in a serving cell.

Random Access Preamble index—6 bits according to ra-PreambleIndex in Subclause 5.1.2 of [TS38.321].

UL/Supplementary Uplink (SUL) indicator—1 bit. If the value of the "Random Access Preamble index" is not all zeros and if the UE is configured with supplementary Uplink in ServingCellConfig in the cell, this field can indicate which UL carrier in the cell to transmit the PRACH according to Table 7.3.1.1.1-1 of 3GPP TS 38.213; otherwise, this field can be reserved.

SS/PBCH index—6 bits. If the value of the "Random Access Preamble index" is not all zeros, this field can indicate the SS/PBCH that shall be used to determine the RACH occasion for the PRACH transmission; otherwise, this field can be reserved.

PRACH Mask index—4 bits. If the value of the "Random Access Preamble index" is not all zeros, this field can indicate the RACH occasion associated with the SS/PBCH indicated by "SS/PBCH index" for the PRACH transmission, according to Subclause 5.1.1 of [8, TS38.321]; otherwise, this field can be reserved.

Reserved bits—(10–X) bits

TABLE 2

Example of random access procedure type and CSI request indicator

| Bit field | Random access procedure type and CSI request indicator |
|---|---|
| 00 | 4-step random access procedure |
| 01 | 2-step random access procedure with a CSI report in MsgA PUSCH according to a first CSI report configuration |
| 10 | 2-step random access procedure with a CSI report in MsgA PUSCH according to a second CSI report configuration |
| 11 | 2-step random access procedure with a CSI report in MsgA PUSCH according to a third CSI report configuration |

In another example, a UE can initiate a 2-step or 4-step random access procedure upon receiving a 'RRCReconfiguration' message including the RRC parameter 'ReconfigurationWithSync' (i.e. SpCell change, handover). According to one implementation, a random access procedure type (2-step RACH vs 4-step RACH) can be indicated in the RRC parameter 'ReconfigurationWithSync', and the 'RACH-ConfigDedicated-2Step' information element can include a dedicated premable index and a dedicated MsgA PUSCH resource associated with the dedicated preamble index, as shown in Tables 3 and 4.

In one embodiment, if the UE is indicated to perform a 2-step random access procedure during the SpCell change, the UE can use an indicated new UE identity ('newUE-Identity') to send a UE identity in MsgA PUSCH (e.g. for contention-based 2-step RACH) and to monitor a PDCCH scheduling MsgB PDSCH (e.g. monitor a DCI format with CRC scrambled with the new UE identity).

TABLE 3

SpCellConfig and ReconfigurationWithSync

-- Serving cell specific MAC and PHY parameters for a SpCell:
SpCellConfig ::=                      SEQUENCE {
  servCellIndex                ServCellIndex         OPTIONAL,
  -- Cond SCG
  reconfigurationWithSync      ReconfigurationWithSync
  OPTIONAL, -- Cond ReconfWithSync TABLE 3-continued

| SpCellConfig and ReconfigurationWithSync |
|---|

```
rlf-TimersAndConstants          SetupRelease { RLF-TimersAndConstants }
  OPTIONAL, -- Need M
rlmInSyncOutOfSyncThreshold     ENUMERATED {n1}
  OPTIONAL, -- Need S
spCellConfigDedicated           ServingCellConfig
  OPTIONAL, -- Need M
  ...
}
ReconfigurationWithSync ::=     SEQUENCE {
  spCellConfigCommon              ServingCellConfigCommon
  OPTIONAL, -- Need M
  newUE-Identity                RNTI-Value,
  t304                          ENUMERATED {ms50, ms100, ms150, ms200, ms500,
  ms1000, ms2000, ms10000},
  rach-ConfigDedicated           CHOICE {
    uplink                          RACH-ConfigDedicated,
    uplink-2Step                    RACH-ConfigDedicated-2Step,
    supplementaryUplink             RACH-ConfigDedicated
    supplementaryUplink-2Step         RACH-ConfigDedicated-2Step
  }                               OPTIONAL, -- Need N
  ...,
  [[
  smtc              SSB-MTC           OPTIONAL --
  Need S
  ]]
}
```

TABLE 4

| RACH-ConfigDedicated-2Step information element |
|---|

```
-- ASN1START
-- TAG-RACH-CONFIGDEDICATED-START
RACH-ConfigDedicated-2Step :=  SEQUENCE {
  cfra                          CFRA-2Step
  OPTIONAL, -- Need S
  ra-Prioritization             RA-Prioritization
  OPTIONAL, -- Need N
  ...
}
CFRA-2Step :=                  SEQUENCE {
  occasions                     SEQUENCE {
    rach-ConfigGeneric            RACH-ConfigGeneric-2Step,
    ssb-perRACH-Occasion          ENUMERATED {oneEighth, oneFourth, oneHalf,
  one, two, four, eight, sixteen}
                                                    OPTIONAL --
  Cond SSB-CFRA
  }                                                 OPTIONAL, --
  Need S
  resources                     CHOICE {
    ssb                           SEQUENCE {
      ssb-ResourceList              SEQUENCE (SIZE(1..maxRA-SSB-Resources)) OF
  CFRA-SSB-Resource-2Step,
      ra-ssb-OccasionMaskIndex      INTEGER (0..15)
    },
    csirs                         SEQUENCE {
      csirs-ResourceList            SEQUENCE (SIZE(1..maxRA-CSIRS-Resources))
  OF CFRA-CSIRS-Resource-2Step,
      rsrp-ThresholdCSI-RS          RSRP-Range
    }
  },
  ...,
  [[
  totalNumberOfRA-Preambles-v1530 INTEGER (1..63)
  OPTIONAL -- Cond Occasions
  ]]
}
CFRA-SSB-Resource-2Step :=             SEQUENCE {
  ssb                           SSB-Index,
  ra-PreambleIndex              INTEGER (0.. 63),
  MsgA-PUSCH                                       MsgA-PUSCH-Index
  ...
}
CFRA-CSIRS-Resource-2Step =            SEQUENCE {
  csi-RS                        CSI-RS-Index,
```

TABLE 4-continued

RACH-ConfigDedicated-2Step information element

| | |
|---|---|
| ra-OccasionList | SEQUENCE (SIZE(1..maxRA-OccasionsPerCSIRS)) OF |
| INTEGER (0..maxRA-Occasions-1), | |
| ra-PreambleIndex | INTEGER (0..63), |
| MsgA-PUSCH | MsgA-PUSCH-Index |
| ... | |
| } | |
| -- TAG-RACH-CONFIGDEDICATED-STOP | |
| -- ASN1STOP | |

At least some embodiments can provide for search space configuration for MsgB. According to Sub-clause 10.1 of 3GPP TS 38.213, a set of PDCCH candidates for a UE to monitor is defined in terms of PDCCH search space sets. A search space set can be a Common Search Space (CSS) set or a UE-specific Search Space (USS) set. A UE can monitor PDCCH candidates in one or more of the following search spaces sets:
- a Type0-PDCCH CSS set configured by pdcch-ConfigSIB1 in Master Information Block (MIB) or by searchSpaceSIB1 in PDCCH-ConfigCommon or by searchSpaceZero in PDCCH-ConfigCommon for a DCI format with CRC scrambled by a System Information (SI)-RNTI on the primary cell of the Master Cell Group (MCG);
- a Type0A-PDCCH CSS set configured by searchSpaceOtherSystemInformation in PDCCH-ConfigCommon for a DCI format with CRC scrambled by a SI-RNTI on the primary cell of the MCG;
- a Type1-PDCCH CSS set configured by ra-SearchSpace in PDCCH-ConfigCommon for a DCI format with CRC scrambled by a RA-RNTI or a TC-RNTI on the primary cell;
- a Type2-PDCCH CSS set configured by paging-SearchSpace in PDCCH-ConfigCommon for a DCI format with CRC scrambled by a Paging (P)-RNTI on the primary cell of the MCG;
- a Type3-PDCCH CSS set configured by SearchSpace in PDCCH-Config with searchSpaceType=common for DCI formats with CRC scrambled by Interruption (INT)-RNTI, Slot Format Indication (SFI)-RNTI, TPC-PUSCH-RNTI, TPC-PUCCH-RNTI, or TPC-Sounding Reference Signal (SRS)-RNTI and, only for the primary cell, C-RNTI, MCS-C-RNTI, or Configured Scheduling (CS)-RNTI(s); and
- a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

According to one embodiment, a UE can be configured with two PDCCH search space sets related to reception of a PDCCH that schedules a MsgB PDSCH for a 2-step random access procedure. In an example, for a first PDCCH search space set, a new type of common search space set, Type1A-PDCCH CSS set, can be configured by a cell specific parameter 'MsgB-SearchSpaceCommon' in PDCCH-ConfigCommon for a DCI format with CRC scrambled by a MsgB-RNTI on a SpCell. For a second PDCCH search space set, a search space set and a corresponding CORESET provided by a UE-specific parameter 'MsgB-SearchSpace' in PDCCH-Config can be configured for a DCI format with CRC scrambled by a C-RNTI or other UE-specific RNTIs. In one example, the second PDCCH search space set can be the USS set configured by SearchSpace in PDCCH-Config with searchSpaceType=ue-Specific.

In one implementation, the UE can be configured with two different MsgB windows, a first MsgB window associated with the first PDCCH search space set (e.g. CSS) and a second MsgB window associated with the second PDCCH search space set (e.g. USS), where a given MsgB time window can be defined in terms of a starting time with respect to an ending time of MsgA (PRACH and MsgA PUSCH) transmission and a duration. For example, the first MsgB window can be configured with a longer duration than the second MsgB window, since a network entity may transmit multiple MsgB PDSCHs with different MAC PDUs within the first MsgB window in order to send many successRARs and/or fallbackRARs associated with one MsgA occasion. In another implementation, the UE can be configured with a same MsgB window for the first and second PDCCH search space sets. Separate search space/CORESET configurations for a broadcast/multicast MsgB PDSCH (schedule by DCI addressed to the MsgB-RNTI) and a unicast MsgB PDSCH (scheduled by DCI addressed to the UE-specific RNTI) can allow PDCCH transmissions optimized for broadcast and for unicast, depending on the PDCCH type.

In an implementation of a contention-based 2-step random access procedure, if the UE includes a UE-specific RNTI in MsgA PUSCH, upon transmitting a PRACH preamble and MsgA PUSCH, the UE can monitor PDCCH candidates both in the first PDCCH search space set within the first MsgB window and in the second PDCCH search space set within the second MsgB window, where the first MsgB window may or may not be the same as the second MsgB window. If the UE has successfully completed the contention-based 2-step random access procedure (including fallback operation to a 4-step random access procedure) but has not been provided other UE-specific search space sets, the UE can monitor PDCCH candidates for fall-back/compact DCI formats (e.g. DCI format 0_0 and DCI format 1_0) with CRC scrambled by the UE-specific RNTI (e.g. C-RNTI) in the second PDCCH search space set provided by MsgB-SearchSpace.

For PDCCH monitoring in the search space sets provided by MsgB-SearchSpaceCommon and MsgB-SearchSpace and for corresponding MsgB PDSCH reception, the UE can assume the same antenna port quasi-collocation parameters as the ones associated for a SS/PBCH block or a CSI-RS resource that the UE used for MsgA (i.e. PRACH preamble and MsgA PUSCH) resource selection.

If the UE receives MsgB PDSCH by detecting the DCI format with CRC scrambled by the MsgB-RNTI in the first PDCCH search space set and finds a fallbackRAR intended to the UE in the received MsgB PDSCH, the UE can perform retransmission of MsgA PUSCH (or transmission of Msg3 PUSCH) according to an UL grant indicated in the fallback- RAR. The first search space set (i.e. Type1A-PDCCH CSS set) provided by MsgB-SearchSpaceCommon, a corresponding CORESET, and TC-RNTI indicated in the fallback RAR can be used for PDCCH scheduling for retransmission of MsgA PUSCH. On the other hand, a PDCCH addressed to the UE-specific RNTI (e.g. C-RNTI) in the second search space set provided by MsgB-SearchSpace can indicate successful contention resolution. Thus, the UE can continue monitoring the first and second PDCCH search space sets during fallback operation. If the UE receives MsgB PDSCH by detecting the DCI format with CRC scrambled by the UE-specific RNTI in the second PDCCH search space set and successfully decodes the MsgB PDSCH, the UE can consider that the contention-based 2-step random access procedure is successfully completed.

In an implementation of a contention-free 2-step random access procedure, a UE can monitor MsgB PDCCH only in the second PDCCH search space set (i.e. USS) provided by MsgB-SearchSpace. If the contention-free 2-step random access procedure was initiated by a PDCCH order, the UE can assume that MsgB PDCCH and the PDCCH order have the same Demodulation Reference Signal (DM-RS) antenna port quasi co-location properties.

If the UE is provided a UE-specific MsgB search space set (e.g. MsgB-SearchSpace), the UE may not expect to be provided another search space set for monitoring PDCCH in the CORESET associated with the search space set provided by MsgB-SearchSpace.

At least some embodiments can provide for PRACH power setting when a UE fallbacks from 2-step RACH to 4-step RACH. PRACH preamble power control parameters can include powerRampingStep and preambleReceivedTargetPower. In one implementation, a UE can receive separate sets of PRACH preamble power control parameters for 2-step and 4-step random access procedures, respectively. In another implementation, the UE can assume that PRACH preamble power control parameters for the 2-step random access procedure are the same as PRACH preamble power control parameters for the 4-step random access procedure, if they are not separately configured.

According to Subclause 7.4 of 3GPP TS 38.213, a UE determines a transmission power for a physical random access channel (PRACH), $P_{PRACH,b,f,c}(i)$ on active UL BWP b of carrier f of serving cell c based on DL RS for serving cell c in transmission occasion i as $$P_{PRACH,b,f,c}(i) = \min\{P_{CMAX,f,c}(i), P_{PRACH,target,f,c} + PL_{b,f,c}\}[dBm],$$

where $P_{CMAX,f,c}(i)$ is the UE configured maximum output power defined in [TS 38.101-1], [TS 38.101-2], and [TS 38.101-3] for carrier f of serving cell c within transmission occasion i, $P_{PRACH,target,f,c}$ is the PRACH target reception power PREAMBLE_RECEIVED_TARGET_POWER provided by higher layers [TS 38.321] for the active UL BWP b of carrier f of serving cell c, and $PL_{b,f,c}$ is a pathloss for the active UL BWP b of carrier f based on the DL RS associated with the PRACH transmission on the active DL BWP of serving cell c and calculated by the UE in dB as referenceSignalPower—higher layer filtered RSRP in dBm, where RSRP is defined in [TS 38.215] and the higher layer filter configuration is defined in [TS 38.331]. If the active DL BWP is the initial DL BWP and for SS/PBCH block and CORESET multiplexing pattern 2 or 3, as described in Subclause 13 of [38.213], the UE can determine $PL_{b,f,c}$ based on the SS/PBCH block associated with the PRACH transmission.

If within a RAR window the UE does not receive any RAR intended to the UE for 2-step RACH (e.g. successRAR, fallbackRAR, or MsgB PDCCH addressed to C-RNTI) or RAR for 4-step RACH that contains a preamble identifier corresponding to the preamble sequence transmitted by the UE, the UE can determine a transmission power for a subsequent PRACH transmission as follows [TS 38.321]:

1> if PREAMBLE TRANSMISSION COUNTER is greater than one; and
1> if the notification of suspending power ramping counter has not been received from lower layers; and
1> if SSB or CSI-RS selected is not changed from the selection in the last Random Access Preamble transmission:
  2> increment PREAMBLE_POWER_RAMPING_COUNTER by 1.
1> select the value of DELTA_PREAMBLE according to clause 7.3 of [TS 38.321];
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP.

If prior to a PRACH retransmission, a UE changes the spatial domain transmission filter, Layer 1 can notify higher layers to suspend the power ramping counter.

During a 2-step random access procedure, if a UE has transmitted PRACH and MsgA PUSCH with a configured number of times (e.g. Ntimes) and has not successfully received MsgB intended to the UE, the UE fallbacks to a 4-step random access procedure and only retransmits PRACH.

In one embodiment, if a UE, after N times MsgA transmissions, switches from a 2-step random access procedure to a 4-step random access procedure and only retransmits PRACH, the power ramping counter can be suspended. Alternatively, the power ramping counter (i.e. PREAMBLE_POWER_RAMPING_COUNTER) can be reset to one. Furthermore, the UE can set PREAMBLE_RECEIVED_TARGET_POWER to preambleReceivedTargetPower1+DELTA_PREAMBLE1+(PREAMBLE_POWER_RAMPING_COUNTER−1)×PREAMBLE_POWER_RAMPING_STEP1, where preambleReceivedTargetPower1, DELTA_PREAMBLE1, and PREAMBLE_POWER_RAMPING_STEP1 are parameters associated with 4-step random access configuration. The UE can apply these methods, if PRACH configuration (including PRACH occasions and PRACH format) for 2-step RACH is configured differently from PRACH configuration for 4-step RACH. Suspending the power ramping counter can provide a trade-off between avoiding unnecessary high interference caused by PRACH transmission and avoiding long random access delay due to multiple PRACH retransmissions. If the UE changes an uplink carrier for the random access procedure (e.g. from Supplementary Uplink (SUL) to Non-supplementary Uplink (NUL) or from NUL to SUL) while switching from the 2-step RACH to the 4-step RACH, the UE can reset the power ramping counter to one.

In another embodiment, if a UE, after N times MsgA transmissions, switches from a 2-step random access procedure to a 4-step random access procedure and only retransmits PRACH, the MAC of the UE can increment the preamble power ramping counter by 1, if the notification of suspending power ramping counter has not been received from lower layers.

Furthermore, the UE can set PREAMBLE_RECEIVED_TARGET_POWER to preambleReceivedTargetPower1+DELTA_PREAMBLE1+(PREAMBLE_POWER_RAMPING_COUNTER−1)×PREAMBLE_POWER_RAMPING_STEP1, where preambleReceivedTargetPower1, DELTA_PREAMBLE1, and PREAMBLE_POWER_ RAMPING_STEP1 are parameters associated with 4-step random access configuration.

Alternatively, the UE can set PREAMBLE_RECEIVED_TARGET_POWER to preambleReceivedTargetPower1+DELTA_PREAMBLE1+(PREAMBLE_POWER_RAMPING_COUNTER−2)×PREAMBLE_POWER_RAMPING_STEP2+PREAMBLE_POWER_RAMPING_STEP1, where PREAMBLE_POWER_RAMPING_STEP2 is a preamble power ramping step associated with 2-step random access configuration.

For example, PREAMBLE_RECEIVED_TARGET_POWER can be a PRACH target reception power provided by higher layers for the active UL BWP, which can be a power desired to be received at a gNB. preambleReceivedTargetPower1 can be an initial PRACH target reception power for 4-step RACH before power ramping is applied. DELTA_PREAMBLE1 can be a power offset value based on the preamble format, where the preamble format can be configured by higher layers, such as a RRC layer. PREAMBLE_POWER_RAMPING_STEP, such as power-RampingStep, can be a power-ramping factor.

The UE can apply these methods if 2-step RACH and 4-step RACH have the same PRACH configuration (e.g. PRACH occasions are shared among 2-step and 4-step RACH). According to another implementation, the UE can perform various embodiments if 2-step RACH and 4-step RACH have different PRACH configurations.

Figure 9:
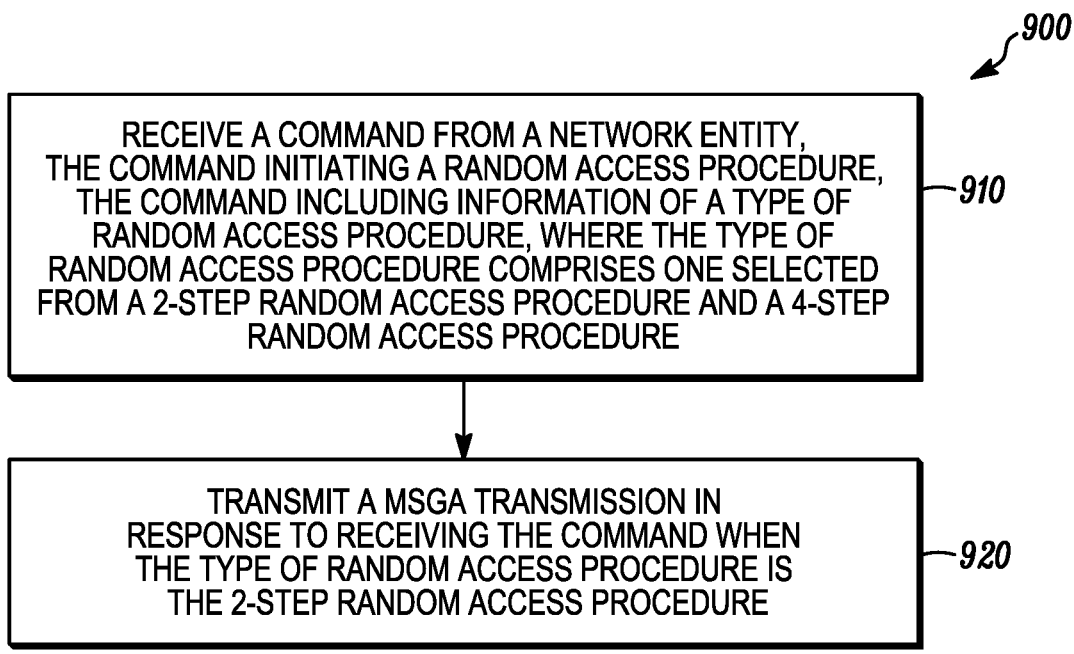
FIG. 9 is an example flowchart illustrating the operation of an apparatus according to a possible embodiment.

FIG. 9 is an example flowchart 900 illustrating the operation of an apparatus, such as the UE 110, according to a possible embodiment. At 910, a command can be received from a network entity. The command can initiate a random access procedure. The command can include information of a type of random access procedure. The type of random access procedure can be one selected from a 2-step random access procedure and a 4-step random access procedure. The command can be received via a physical layer, such as in a PDCCH order, or via higher layers, such as in a RRC parameter.

At 920, a MsgA transmission can be transmitted in response to receiving the command when the type of random access procedure is the 2-step random access procedure. According to a possible embodiment, the type of random access procedure can be determined to be a 2-step random access procedure based on the information and the MsgA transmission can be transmitted in response to determining the type of random access procedure being the 2-step random access procedure.

According to a possible embodiment, the command can be downlink control information including an indication of initiation of a PDCCH order based random access procedure. According to another possible embodiment, the command can be a command of a handover in a higher layer message including a plurality of radio resource control parameters that reconfigure a radio resource control configuration. The handover can include reconfiguration of the plurality of radio resource control parameters and synchronization. The MsgA transmission can be transmitted in response to receiving the command of the handover in the higher layer message. For example, the higher layer message can be a 'RRCReconfiguration' message and the command of the handover can be a 'ReconfigurationWahSync' parameter, which can indicate for SpCell change, that is, handover, and other reconfigurations. SpCell can be a special primary cell of a cell group, for example, a Primary Cell (PCell) of a Master Cell Group (MCG) and a Primary Secondary Cell (PSCell) of a Secondary Cell Group (SCG).

According to a possible embodiment, information of at least one dedicated PRACH preamble and at least one corresponding set of PRACH occasions for the 2-step random access procedure can be received when the type of random access procedure is a 2-step random access procedure. Transmitting the MsgA transmission can include transmitting a dedicated PRACH preamble of the at least one dedicated PRACH preamble on a PRACH occasion of a set of PRACH occasions of the at least one set of PRACH occasions. The set of PRACH occasions can be associated with the dedicated PRACH preamble. For example, according to one implementation, a random access procedure type (2-step RACH vs 4-step RACH) can be indicated in the RRC parameter 'ReconfigurationWithSync', and the 'RACH-ConfigDedicated-2Step' information element can include a dedicated premable index and a dedicated MsgA PUSCH resource associated with the dedicated preamble index.

According to a possible implementation, information of at least one dedicated MsgA PUSCH resource can be received when the type of random access procedure is a 2-step random access procedure. The at least one dedicated MsgA PUSCH resource can be associated with the at least one dedicated PRACH preamble and associated with the at least one set of PRACH occasions for the 2-step random access procedure. Transmitting the MsgA transmission can include transmitting the dedicated PRACH preamble on the PRACH occasion and transmitting a corresponding MsgA PUSCH on a dedicated MsgA PUSCH resource of the at least one dedicated MsgA PUSCH resource.

According to a possible embodiment, an indication requesting a CSI report can be received when the type of random access procedure is a 2-step random access procedure. The MsgA transmission can include a MsgA PUSCH including the CSI report. According to a possible implementation, receiving the command can include receiving DCI including a field with the indication requesting the CSI report jointly encoded with the information of the type of random access procedure. For example, the CSI request and the random access procedure type can be jointly encoded in one bit field or separately indicated with different bit fields in DCI According to a possible embodiment, a configuration of first and second PDCCH search space sets for reception of a PDCCH can be received in response to transmitting the MsgA transmission when the type of random access procedure is the 2-step random access procedure. After transmitting the MsgA transmission, a plurality of PDCCH candidates can be monitored in at least one of the first and second PDCCH search space sets in the 2-step random access procedure.

According to a possible implementation, monitoring the plurality of the PDCCH candidates can include monitoring the plurality of the PDCCH candidates in a time window. A starting time of the time window can be based on an ending time of the MsgA transmission and the configuration of the first and second PDCCH search space sets. The time window associated with the first PDCCH search space set may or may not be different from the time window associated with the second PDCCH search space set. The time window can be defined in terms of a starting time with respect to an ending time of MsgA transmission and can be defined in terms of a duration of time of the time window.

According to a possible implementation, the first PDCCH search space set can be a common search space set for a DCI format with a cyclic redundancy check scrambled by a first identity. The second PDCCH search space set can be a UE-specific search space set for a DCI format with a cyclic redundancy check scrambled by a second identity.

According to a possible example of the above implementation, the first identity can be a MsgB-RNTI determined based on a PRACH occasion used for a PRACH preamble transmission of the MsgA transmission. The MsgB-RNTI can be used to receive a PDCCH scheduling a MsgB PDSCH corresponding to the MsgA transmission. The MsgB PDSCH can be decoded. A determination can be made as to whether the MsgB PDSCH includes a fallback-RAR intended to the UE.

According to another possible example of the above implementation, the second identity can be a user equipment-specific identity and the MsgA transmission can include a MsgA PUSCH including the user equipment-specific identity. According to a possible implementation, the MsgA transmission can include a contention-based PRACH preamble transmission. Monitoring the plurality of PDCCH candidates can include monitoring the plurality of PDCCH candidates in the first and second PDCCH search space sets.

Figure 10:
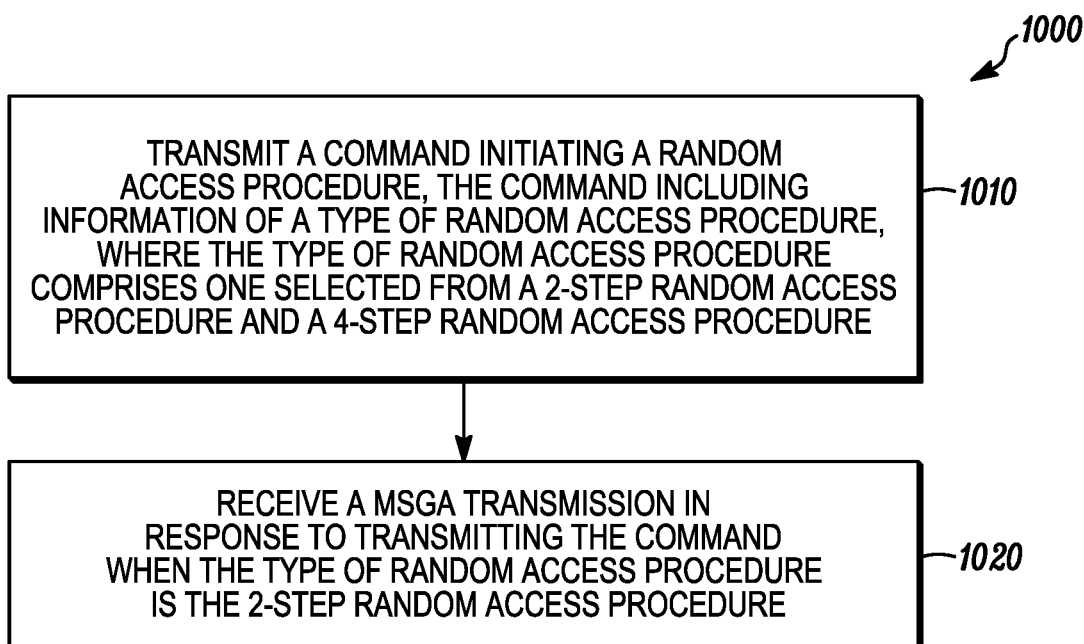
FIG. 10 is an example flowchart illustrating the operation of an apparatus according to a possible embodiment.

FIG. 10 is an example flowchart 1000 illustrating the operation of an apparatus, such as the network entity 120, according to a possible embodiment. At 1010, a command initiating a random access procedure can be transmitted. The command can include information of a type of random access procedure. The type of random access procedure can be one selected from a 2-step random access procedure and a 4-step random access procedure. According to a possible implementation, prior to sending the command, a determination can be made as to whether the type of random access procedure is the 2-step random access procedure or the 4-step random access procedure and the command can be sent in response to the determination. At 1020, a MsgA transmission can be received in response to transmitting the command based on the type of random access procedure being the 2-step random access procedure.

Figure 11:
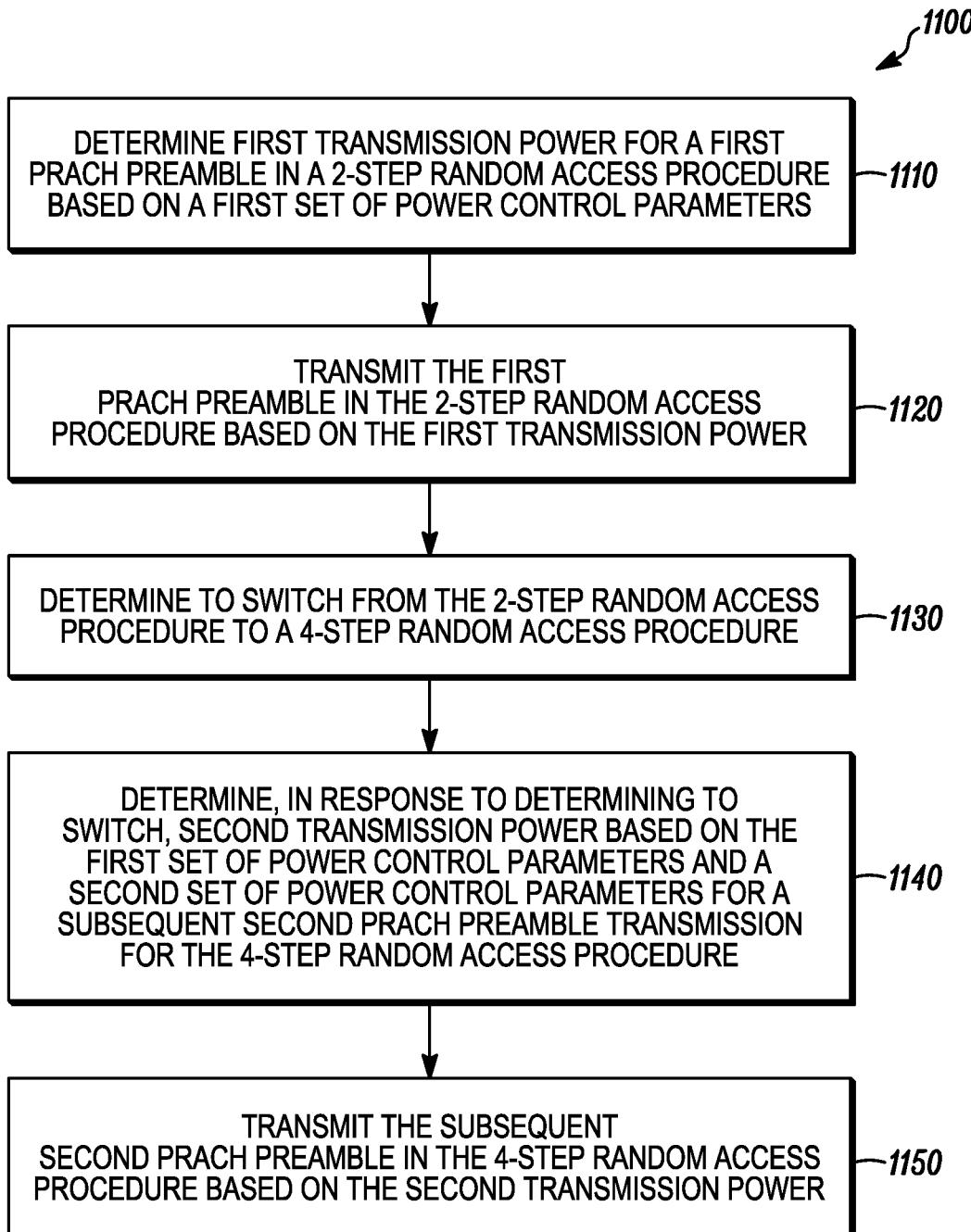
FIG. 11 is an example flowchart illustrating the operation of an apparatus according to a possible embodiment.

FIG. 11 is an example flowchart 1100 illustrating the operation of an apparatus, such as the UE 110, according to a possible embodiment. At 1110, a first transmission power for a first PRACH preamble in a 2-step random access procedure can be determined based on a first set of power control parameters. At 1120, the first PRACH preamble can be transmitted in the 2-step random access procedure based on the first transmission power.

At 1130, a determination can be made to switch from the 2-step random access procedure to a 4-step random access procedure. Determining to switch can include determining to switch from the 2-step random access procedure to the 4-step random access procedure based on performing a MsgA PRACH transmission in the 2-step random access procedure a threshold number of times without successfully receiving a MsgB RAR message in response to the MsgA PRACH transmission.

At 1140, in response to determining to switch, second transmission power can be determined based on the first set of power control parameters and a second set of power control parameters for a subsequent second PRACH preamble transmission for the 4-step random access procedure. At 1150, the subsequent second PRACH preamble can be transmitted in the 4-step random access procedure based on the second transmission power.

According to a possible embodiment, the operation can include transmitting a MsgA PUSCH associated with the first PRACH preamble in the 2-step random access procedure.

According to a possible embodiment, the operation can include receiving a 2-step random access channel configuration and a 4-step random access channel configuration. According to a possible implementation, the 2-step random access channel configuration can include the first set of power control parameters and the 4-step random access channel configuration can include the second set of power control parameters. According to a possible implementation, the 2-step random access channel configuration can include a first PRACH preamble format and the 4-step random access channel configuration includes a second PRACH preamble format. The first transmission power can be dependent on a first power offset corresponding to the first preamble format and the second transmission power can be dependent on a second power offset corresponding to the second preamble format.

According to a possible embodiment, the first set of power control parameters can include a first power ramping factor and a first initial preamble received target power and the second set of power control parameters can include a second power ramping factor and a second initial preamble received target power. According to a possible implementation, the operation can include incrementing a preamble power ramping counter by 1 before determining the second transmission power. According to a possible implementation, the operation can include setting a second PRACH target reception power to a value equal to the second initial preamble received target power+a second preamble format-specific power offset+(the preamble power ramping counter−2)×the first power ramping factor+the second power ramping factor. According to a possible implementation, the second transmission power, $P_{PRACH,b,f,c}(i)$, for the second PRACH preamble transmission on an active UL BWP b of carrier f of serving cell c based on a downlink reference signal for the serving cell c in transmission occasion i can be determined as:

$$P_{PRACH,b,f,c}(i) \min\{P_{CMAX,f,c}(i), P_{PRACH,target,f,c} + PL_{b,f,c}\}[\text{dBm}].$$

$P_{CMAX,f,c}(i)$ can be a UE configured maximum output power for the carrier f of the serving cell c within the transmission occasion i. $P_{PRACH,target,f,c}$ can be the second PRACH target reception power, which is provided by a higher layer for the active UL BWP b of the carrier f of the serving cell c, where the higher layer is higher than a physical layer. $PL_{b,f,c}$ can be a pathloss for the active UL BWP b of the carrier f based on the downlink reference signal associated with the second PRACH preamble transmission, where the downlink reference signal is on an active DL BWP of the serving cell c and where the pathloss, $PL_{b,f,c}$, is calculated by the UE. The second PRACH target reception power, $P_{PRACH,target,f,c}$ can be provided by higher layers.

Figure 12:
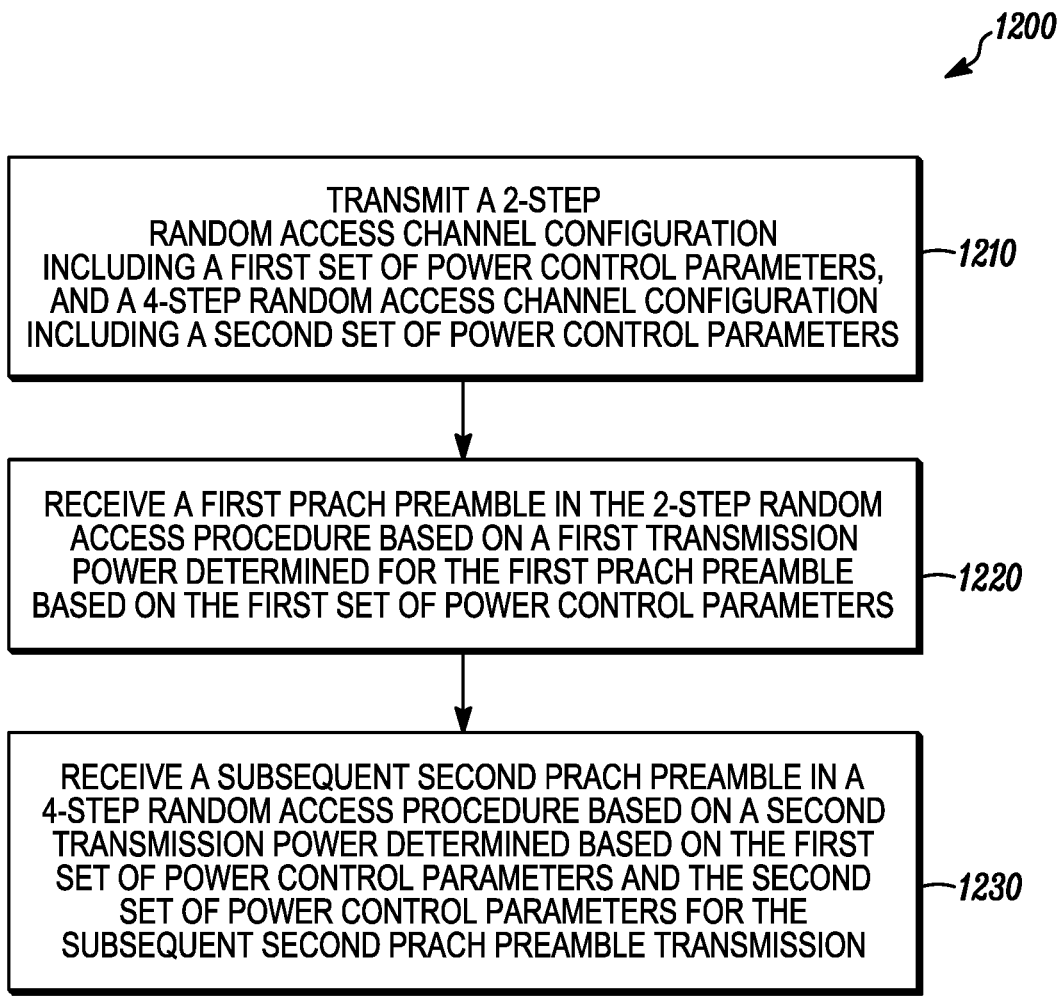
FIG. 12 is an example flowchart illustrating the operation of an apparatus according to a possible embodiment.

FIG. 12 is an example flowchart 1200 illustrating the operation of an apparatus, such as the network entity 120, according to a possible embodiment. At 1210, a 2-step random access channel configuration including a first set of power control parameters and a 4-step random access channel configuration including a second set of power control parameters can be transmitted. At 1220, a first PRACH preamble can be received in the 2-step random access procedure based on a first transmission power determined for the first PRACH preamble based on the first set of power control parameters. At 1230, a subsequent second PRACH preamble can be received in a 4-step random access procedure based on a second transmission power determined based on the first set of power control parameters and the second set of power control parameters for the subsequent second PRACH preamble transmission. The first PRACH preamble and the subsequent second PRACH preamble can be transmitted from a same UE.

Figure 13:
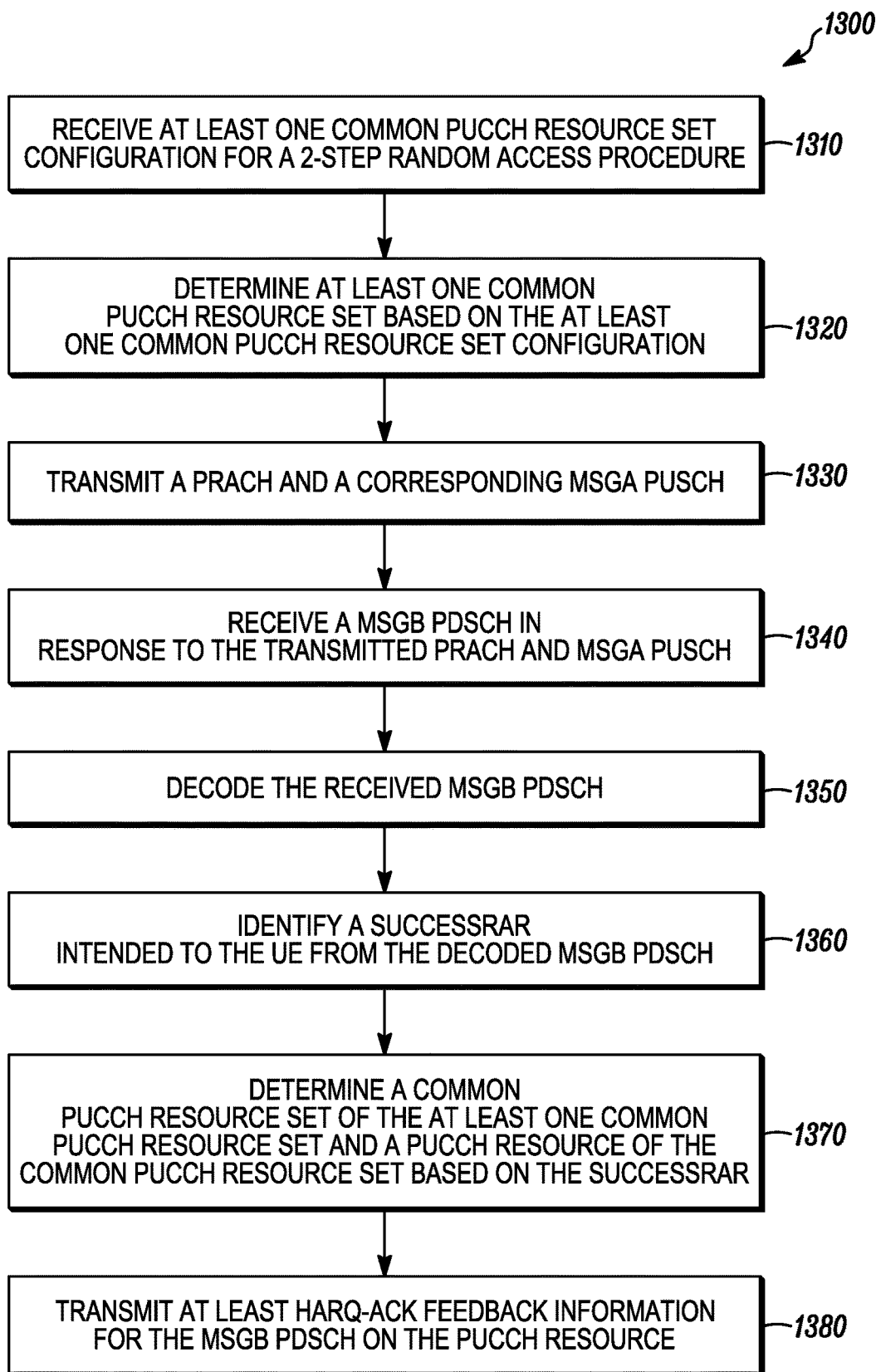
FIG. 13 is an example flowchart illustrating the operation of an apparatus according to a possible embodiment.

FIG. 13 is an example flowchart 1300 illustrating the operation of an apparatus, such as the UE 110, according to a possible embodiment. At 1310, at least one common PUCCH resource set configuration for a 2-step random access procedure can be received. At 1320, at least one common PUCCH resource set can be determined based on the at least one common PUCCH resource set configuration.

At 1330, a PRACH and a corresponding MsgA PUSCH can be transmitted. A MsgA PUSCH can be a user data transmission from a UE to a network entity in a 2-step random access procedure.

At 1340, a MsgB PDSCH can be received in response to the transmitted PRACH and MsgA PUSCH. A MsgB can be a message from a network entity to a UE in a 2-step random access procedure. At 1350, the received MsgB PDSCH can be decoded. At 1360, a successRAR intended to the UE can be identified from the decoded MsgB PDSCH.

At 1370, a common PUCCH resource set of the at least one common PUCCH resource set and a PUCCH resource of the common PUCCH resource set can be determined based on the successRAR. At 1380, at least HARQ-ACK feedback information for the MsgB PDSCH can be transmitted on the PUCCH resource.

According to a possible embodiment, each of the at least one common PUCCH resource set configuration defines each of the at least one common PUCCH resource sets.

According to a possible embodiment, a DCI format addressed to a MsgB-RNTI can be detected. A MsgB-RNTI can be a radio network temporary identifier for a plurality of UEs that select a particular PRACH occasion for a PRACH preamble transmission in a 2-step random access procedure. The DCI format addressed to the MsgB-RNTI can be the DCI format included in a PDCCH with a CRC scrambled by the MsgB-RNTI. The MsgB PDSCH can be received based on the detected DCI format.

According to a possible embodiment, a particular common PUCCH resource set configuration of the at least one common PUCCH resource set configuration can be used for a 4-step random access procedure.

According to a possible embodiment, transmitting at least the HARQ-ACK feedback information can include transmitting at least the HARQ-ACK feedback information based on the successRAR intended to the UE being identified from the decoded MsgB PDSCH and based on the HARQ-ACK information comprising an acknowledgement. For example, the UE can transmit HARQ-ACK information only if the HARQ-ACK information is an acknowledgement (no HARQ-ACK transmission for NACK).

According to a possible embodiment, the successRAR can include an indication whether to multiplex a CSI report with the HARQ-ACK information on the PUCCH resource. The common PUCCH resource set can be determined based on the indication. According to a possible implementation, the indication can further include information of a CSI report type. The common PUCCH resource set can be determined based on the information of the CSI report type.

According to a possible embodiment, each of the at least one common PUCCH resource set configuration includes information of a PUCCH format.

According to a possible embodiment, a higher-layer UE identifier can be sent on the MsgA PUSCH. For example, a higher-layer UE identifier can be included in a Common Control Channel Service Data Unit (CCCH SDU). According to a possible implementation, identifying the successRAR intended to the UE can include identifying a successRAR with a contention resolution identifier, where the contention resolution identifier is based on the higher-layer UE identifier.

According to a possible embodiment, an indication can be received. The indication can indicate whether at least one re-transmission of a transport block of the MsgB PDSCH by a network entity is allowed in order to enable the UE to receive and combine data of the transport block from each transmission of the transport block by the network entity. DCI scheduling the transport block can be received based on the indication. For example, the operation can include receiving and combining data of the transport block from multiple transmissions of the transport block by the network entity if re-transmission of the transport block of the MsgB PDSCH by a network entity is allowed.

According to a possible implementation, receiving the DCI can include receiving the DCI including at least one field related to combining of the data of the transport block in response to receiving the indication that at least one re-transmission of the transport block of the MsgB PDSCH by the network entity is allowed. The DCI can be received without at least one field related to combining of the data of the transport block in response to receiving the indication that at least one re-transmission of the transport block of the MsgB PDSCH by the network entity is not allowed. For example, the field can be a new data indicator field 1 bit if HARQ combining of MsgB PDSCH is supported in 3GPP Rel-16 NR and enabled. Otherwise, 0 bit. If HARQ combining is configured not to be supported, the new data indicator field can be reserved (i.e. not used).

Figure 14:
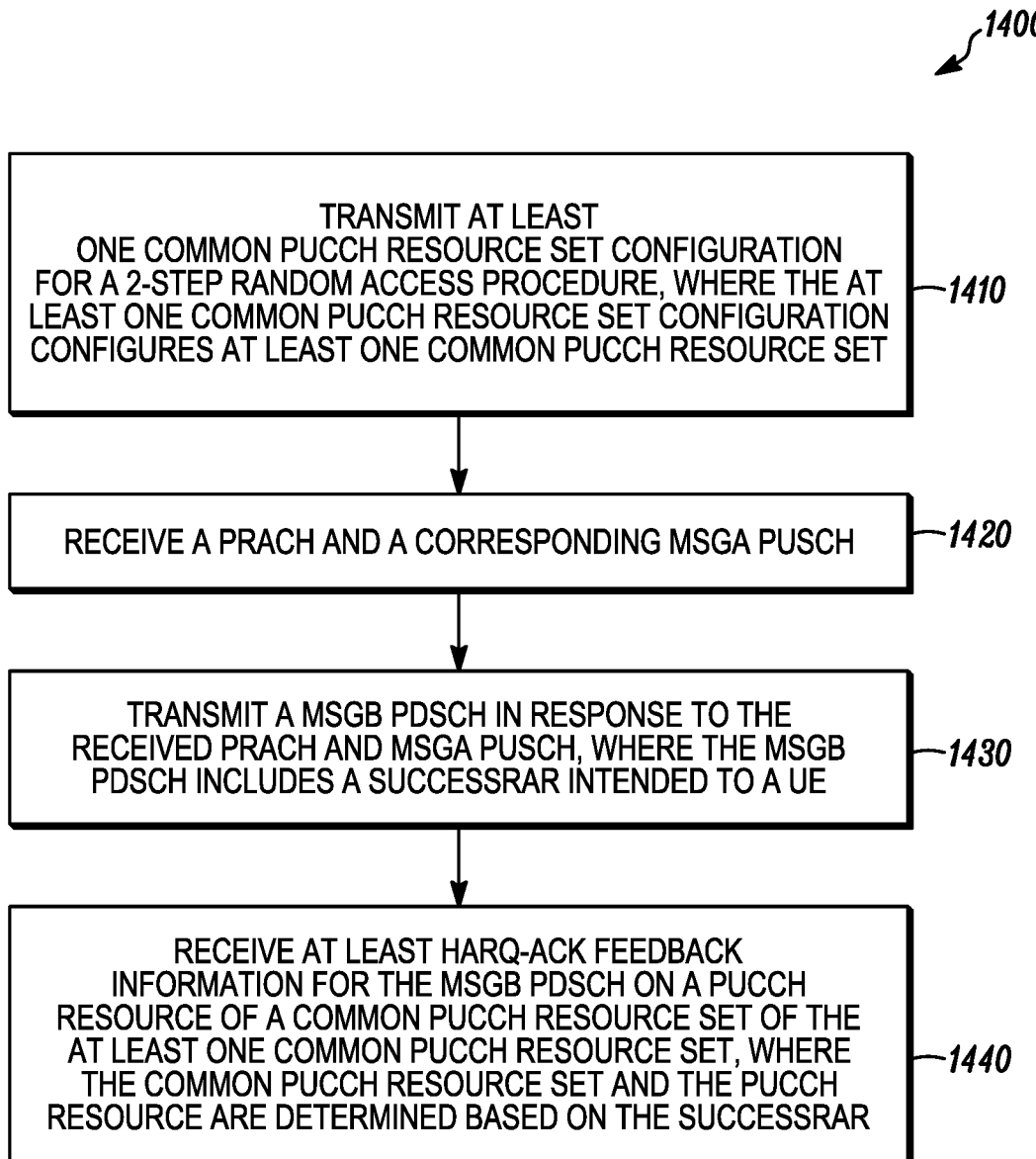
FIG. 14 is an example flowchart illustrating the operation of an apparatus according to a possible embodiment.

FIG. 14 is an example flowchart 1400 illustrating the operation of an apparatus, such as the network entity 120, according to a possible embodiment. At 1410, at least one common PUCCH resource set configuration for a 2-step random access procedure can be transmitted. The at least one common PUCCH resource set configuration can configure at least one common PUCCH resource set. At 1420, a PRACH and a corresponding MsgA PUSCH can be received. At 1430, a MsgB PDSCH can be transmitted in response to the received PRACH and MsgA PUSCH. The MsgB PDSCH can include a successRAR intended to a UE. At 1440, at least HARQ-ACK feedback information for the MsgB PDSCH can be received on a PUCCH resource of a common PUCCH resource set of the at least one common PUCCH resource set. The common PUCCH resource set and the PUCCH resource can be determined based on the successRAR.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 15:
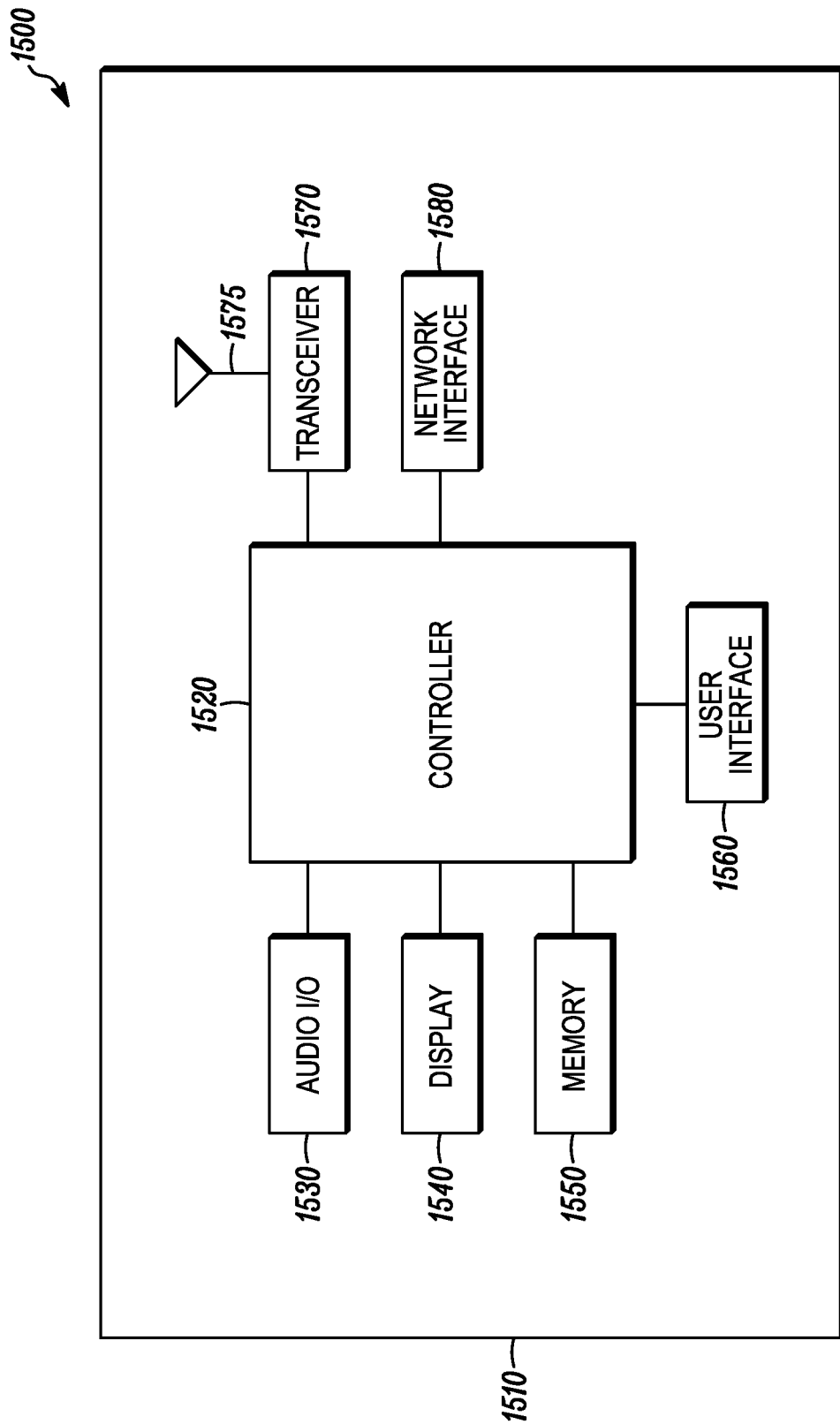
FIG. 15 is an example block diagram of an apparatus according to a possible embodiment.

FIG. 15 is an example block diagram of an apparatus 1500, such as the UE 110, the network entity 120, or any other wireless communication device disclosed herein, according to a possible embodiment. The apparatus 1500 can include a housing 1510, a controller 1520 coupled to the housing 1510, audio input and output circuitry 1530 coupled to the controller 1520, a display 1540 coupled to the controller 1520, a memory 1550 coupled to the controller 1520, a user interface 1560 coupled to the controller 1520, a transceiver 1570 coupled to the controller 1520, at least one antenna 1575 coupled to the transceiver 1570, and a network interface 1580 coupled to the controller 1520. The apparatus 1500 may not necessarily include all of the illustrated elements for different embodiments of the present disclosure. The apparatus 1500 can perform the methods described in all the embodiments.

The display 1540 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1570 can be one or more transceivers that can include a transmitter and/or a receiver. The audio input and output circuitry 1530 can include a microphone, a speaker, a transducer, or any other audio input and output circuitry. The user interface 1560 can include a keypad, a keyboard, buttons, a touch pad, a joystick, a touch screen display, another additional display, or any other device useful for providing an interface between a user and an electronic device. The network interface 1580 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1550 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 1500 or the controller 1520 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1550, elsewhere on the apparatus 1500, in cloud storage, and/or anywhere else that can store software and/or an operating system. The apparatus 1500 or the controller 1520 may also use hardware to implement disclosed operations. For example, the controller 1520 may be any programmable processor. Furthermore, the controller 1520 may perform some or all of the disclosed operations. For example, at least some operations can be performed using cloud computing and the controller 1520 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1520 may be any controller or processor device or devices capable of operating an apparatus and implementing the disclosed embodiments. Some or all of the additional elements of the apparatus 1500 can also perform some or all of the operations of the disclosed embodiments.

In operation, the apparatus 1500 can perform the methods and operations of the disclosed embodiments. The transceiver 1570 can transmit and receive signals, including data signals and control signals that can include respective data and control information. The controller 1520 can generate and process the transmitted and received signals and information.

In operation according to possible embodiment, the transceiver 1570 can receive a command from a network entity. The command can initiate a random access procedure. The command can include information of a type of random access procedure. The type of random access procedure can be one selected from a 2-step random access procedure and a 4-step random access procedure. The controller 1520 can determine the type of random access procedure is a 2-step random access procedure based on information indicating the type of random access procedure is a 2-step random access procedure. The transceiver 1570 can transmit a MsgA transmission in response to receiving the command when the type of random access procedure is the 2-step random access procedure.

According to a possible embodiment, the command can be downlink control information including an indication of initiation of a PDCCH order based random access procedure. According to another possible embodiment, the command can be a command of a handover in a higher layer message including a plurality of radio resource control parameters that reconfigure a radio resource control configuration. The handover can include reconfiguration of the plurality of radio resource control parameters and synchronization. The transceiver 1570 can transmit the MsgA transmission in response to receiving the command of the handover in the higher layer message.

According to a possible embodiment, the transceiver 1570 can receive, when the type of random access procedure is a 2-step random access procedure, information of at least one dedicated PRACH preamble and at least one corresponding set of PRACH occasions for the 2-step random access procedure. The transceiver 1570 can transmit the MsgA transmission by transmitting a dedicated PRACH preamble of the at least one dedicated PRACH preamble on a PRACH occasion of a set of PRACH occasions of the at least one set of PRACH occasions. The set of PRACH occasions can be associated with the dedicated PRACH preamble. According to a possible implementation, the transceiver 1570 can receive, when the type of random access procedure is a 2-step random access procedure, information of at least one dedicated MsgA PUSCH resource associated with the at least one dedicated PRACH preamble and associated with the at least one set of PRACH occasions for the 2-step random access procedure. The transceiver 1570 can transmit the MsgA transmission by transmitting the dedicated PRACH preamble on the PRACH occasion and transmitting a corresponding MsgA PUSCH on a dedicated MsgA PUSCH resource of the at least one dedicated MsgA PUSCH resource.

According to a possible embodiment, the transceiver 1570 can receive a configuration of first and second PDCCH search space sets for reception of a PDCCH in response to transmitting the MsgA transmission when the type of random access procedure is the 2-step random access procedure. The controller 1520 can monitor, after the transceiver 1570 transmits the MsgA transmission, a plurality of PDCCH candidates in at least one of the first and second PDCCH search space sets in the 2-step random access procedure. According to a possible implementation, the first PDCCH search space set can be a common search space set for a DCI format with a cyclic redundancy check scrambled by a first identity. The second PDCCH search space set can be a UE-specific search space set for a DCI format with a cyclic redundancy check scrambled by a second identity.

In operation according to a possible embodiment, the controller 1520 can determine first transmission power for a first PRACH preamble in a 2-step random access procedure based on a first set of power control parameters. The transceiver 1570 can transmit the first PRACH preamble in the 2-step random access procedure based on the first transmission power. The controller 1520 can determine to switch from the 2-step random access procedure to a 4-step random access procedure. The controller 1520 can determine, in response to determining to switch, second transmission power based on the first set of power control parameters and a second set of power control parameters for a subsequent second PRACH preamble transmission for the 4-step random access procedure. The transceiver 1570 can transmit the subsequent second PRACH preamble in the 4-step random access procedure based on the second transmission power.

According to a possible embodiment, the transceiver 1570 can transmit a MsgA PUSCH associated with the first PRACH preamble in the 2-step random access procedure.

According to a possible embodiment, the transceiver 1570 can receive a 2-step random access channel configuration and a 4-step random access channel configuration. The 2-step random access channel configuration can include the first set of power control parameters and the 4-step random access channel configuration can include the second set of power control parameters. The 2-step random access channel configuration can include a first PRACH preamble format and the 4-step random access channel configuration can include a second PRACH preamble format. The first transmission power can be dependent on a first power offset corresponding to the first preamble format and the second transmission power can be dependent on a second power offset corresponding to the second preamble format.

According to a possible embodiment, the first set of power control parameters can include a first power ramping factor and a first initial preamble received target power. The second set of power control parameters can include a second power ramping factor and a second initial preamble received target power. The controller 1520 can increment a preamble power ramping counter by 1 before determining the second transmission power. The controller 1520 can set a second PRACH target reception power to a value equal to the second initial preamble received target power+a second preamble format-specific power offset+(the preamble power ramping counter−2)×the first power ramping factor+the second power ramping factor. The controller 1520 can determine the second transmission power, $P_{PRACH,b,f,c}(i)$ for the second PRACH preamble transmission on an active UL BWP b of carrier f of serving cell c based on a downlink reference signal for the serving cell c in transmission occasion i as $$P_{PRACH,b,f,c}(i)=\min\{P_{CMAX,f,c}(i),P_{PRACH,target,f,c}+PL_{b,f,c}\}[\text{dBm}].$$

$P_{CMAX,f,c}(i)$ can be a UE configured maximum output power for the carrier f of the serving cell c within the transmission occasion i. $P_{PRACH,target,f,c}$ can be the second PRACH target reception power, which can be provided by a higher layer for the active UL BWP b of the carrier f of the serving cell c, where the higher layer can be higher than a physical layer. $PL_{b,f,c}$ can be a pathloss for the active UL BWP b of the carrier f based on the downlink reference signal associated with the second PRACH preamble transmission, where the downlink reference signal can be on an active DL BWP of the serving cell c and where the pathloss, $PL_{b,f,c}$ can be calculated by the UE.

According to a possible embodiment, the controller 1520 can determine to switch from the 2-step random access procedure to the 4-step random access procedure based on performing a MsgA PRACH transmission in the 2-step random access procedure a threshold number of times without successfully receiving a MsgB RAR message in response to the MsgA PRACH transmission.

In operation according to another possible embodiment, the transceiver 1570 can receive at least one common PUCCH resource set configuration for a 2-step random access procedure. The controller 1520 can determine at least one common PUCCH resource set based on the at least one common PUCCH resource set configuration. The transceiver 1570 can transmit a PRACH and a corresponding MsgA PUSCH. The transceiver 1570 can receive a MsgB PDSCH in response to the transmitted PRACH and MsgA PUSCH. The controller 1520 can decode the received MsgB PDSCH. The controller 1520 can identify a successRAR intended to the UE from the decoded MsgB PDSCH. The controller 1520 can determine a common PUCCH resource set of the at least one common PUCCH resource set and a PUCCH resource of the common PUCCH resource set based on the successRAR. The transceiver 1570 can transmit at least HARQ-ACK feedback information for the MsgB PDSCH on the PUCCH resource.

According to a possible embodiment, each of the at least one common PUCCH resource set configuration can define each of the at least one common PUCCH resource sets.

According to a possible embodiment, the controller 1520 can detect a DCI format addressed to a MsgB-RNTI. The DCI format addressed to the MsgB-RNTI can be the DCI format included in a PDCCH with a CRC scrambled by the MsgB-RNTI. The MsgB PDSCH can be received based on the detected DCI format.

According to a possible embodiment, a particular common PUCCH resource set configuration of the at least one common PUCCH resource set configuration can be used for a 4-step random access procedure.

According to a possible embodiment, the transceiver 1570 can transmit at least the HARQ-ACK feedback information based on the successRAR intended to the apparatus being identified from the decoded MsgB PDSCH and based on the HARQ-ACK information comprising an acknowledgement.

According to a possible embodiment, the successRAR can include an indication of whether to multiplex a CSI report with the HARQ-ACK information on the PUCCH resource. The common PUCCH resource set can be determined based on the indication. According to a possible implementation, the indication can further include information of a CSI report type. The common PUCCH resource set can be determined based on the information of the CSI report type.

According to a possible embodiment, each of the at least one common PUCCH resource set configuration can include information of a PUCCH format.

Embodiments can provide a method in a UE. The method can include receiving one or more common PUCCH resource set configurations for a 2-step random access procedure. The method can include determining one or more common PUCCH resource sets based on the one or more common PUCCH resource set configurations. The method can include transmitting a PRACH on a PRACH occasion and a corresponding MsgA PUSCH. The method can include detecting a DCI format addressed to a MsgB-RNTI. The MsgB-RNTI can be at least based on the PRACH occasion. The method can include receiving a MsgB PDSCH based on the detected DCI format. The method can include decoding the received MsgB PDSCH. The method can include identifying a successRAR intended to the UE from the decoded MsgB PDSCH. The method can include determining a common PUCCH resource set and a PUCCH resource of the common PUCCH resource set based on the successRAR. The method can include transmitting at least HARQ-ACK feedback information on the PUCCH resource.

According to a possible embodiment, each of the one or more common PUCCH resource set configurations can define each of the one or more common PUCCH resource sets.

According to a possible embodiment, the DCI format addressed to the MsgB-RNTI can be the DCI format included in a PDCCH with a CRC scrambled by the MsgB-RNTI.

According to a possible embodiment, a common PUCCH resource set configuration of the one or more common PUCCH resource set configurations can be used for a 4-step random access procedure.

According to a possible embodiment, the HARQ-ACK feedback information can be an acknowledgement.

According to a possible embodiment, the successRAR can include an indication whether to multiplex a CSI report with the HARQ-ACK information on the PUCCH resource. The common PUCCH resource set can be determined based on the indication. According to a possible implementation, the indication can include information of a CSI report type. The common PUCCH resource set can be determined based on the information of the CSI report type.

According to a possible embodiment, each of the one or more common PUCCH resource set configurations can include information of a PUCCH format.

According to a possible embodiment, the method can include sending a higher-layer UE identifier (e.g. CCCH SDU) on the MsgA PUSCH.

According to a possible implementation, identifying the successRAR intended to the UE can include identifying a successRAR with a contention resolution identifier. The contention resolution identifier can be based on the higher-layer UE identifier.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A method in a user equipment, the method comprising:
    determining first transmission power for a first physical random access channel preamble in a 2-step random access procedure based on a first set of power control parameters;
    transmitting the first physical random access channel preamble in the 2-step random access procedure based on the first transmission power;
    determining to switch from the 2-step random access procedure to a 4-step random access procedure;
    determining, in response to determining to switch, second transmission power based on the first set of power control parameters and a second set of power control parameters for a subsequent second physical random access channel preamble transmission for the 4-step random access procedure; and
    transmitting the subsequent second physical random access channel preamble transmission in the 4-step random access procedure based on the second transmission power, wherein the method further comprises:
   incrementing a preamble power ramping counter by 1 before determining the second transmission power; and
   setting a second physical random access channel target reception power to a value equal to a second initial preamble received target power+a second preamble format-specific power offset+(the preamble power ramping counter−2)×a first power ramping factor+a second power ramping factor.

2. The method according to claim 1, further comprising transmitting a MsgA physical uplink shared channel associated with the first physical random access channel preamble in the 2-step random access procedure.

3. The method according to claim 1, further comprising receiving a 2-step random access channel configuration and a 4-step random access channel configuration.

4. The method according to claim 3, wherein the 2-step random access channel configuration includes the first set of power control parameters and the 4-step random access channel configuration includes the second set of power control parameters.

5. The method according to claim 3, wherein the 2-step random access channel configuration includes a first physical random access channel preamble format and the 4-step random access channel configuration includes a second physical random access channel preamble format, wherein the first transmission power is dependent on a first power offset corresponding to the first physical random access channel preamble format and the second transmission power is dependent on a second power offset corresponding to the second physical random access channel preamble format.

6. The method according to claim 1, wherein:
   the first set of power control parameters comprise the first power ramping factor and a first initial preamble received target power; and
   the second set of power control parameters comprise the second power ramping factor and the second initial preamble received target power.

7. The method according to claim 1, wherein the second transmission power, $P_{PRACH,b,f,c}(i)$, for the subsequent second physical random access channel preamble transmission on an active uplink bandwidth part b of carrier f of serving cell c based on a downlink reference signal for the serving cell c in transmission occasion i is determined as $$P_{PRACH,b,f,c}(i) = \min\{P_{CMAX,f,c}(i), P_{PRACH,target,f,c} + PL_{b,f,c}\}[\text{dBm}],$$

where $P_{CMAX,f,c}(i)$ is a user equipment configured maximum output power for the carrier f of the serving cell c within the transmission occasion i, where $P_{PRACH,target,f,c}$ is the second physical random access channel target reception power, which is provided by a higher layer for the active uplink bandwidth part b of the carrier f of the serving cell c, where the higher layer is higher than a physical layer, and where $PL_{b,f,c}$ is a pathloss for the active uplink bandwidth part b of the carrier f based on the downlink reference signal associated with the subsequent second physical random access channel preamble transmission, where the downlink reference signal is on an active downlink bandwidth part of the serving cell c and where the pathloss, $PL_{b,f,c}$, is calculated by the user equipment.

8. The method according to claim 1, wherein determining to switch comprises determining to switch from the 2-step random access procedure to the 4-step random access procedure based on performing a MsgA physical random access channel transmission in the 2-step random access procedure a threshold number of times without successfully receiving a MsgB random access response message in response to the MsgA physical random access channel transmission.

9. An apparatus comprising:
   a controller that determines first transmission power for a first physical random access channel preamble in a 2-step random access procedure based on a first set of power control parameters; and
   a transceiver coupled to the controller, where the transceiver transmits the first physical random access channel preamble in the 2-step random access procedure based on the first transmission power,
   wherein the controller:
      determines to switch from the 2-step random access procedure to a 4-step random access procedure,
      determines, in response to determining to switch, second transmission power based on the first set of power control parameters and a second set of power control parameters for a subsequent second physical random access channel preamble transmission for the 4-step random access procedure,
   wherein the transceiver transmits the subsequent second physical random access channel preamble transmission in the 4-step random access procedure based on the second transmission power, and
   wherein the controller:
      increments a preamble power ramping counter by 1 before determining the second transmission power, and
      sets a second physical random access channel target reception power to a value equal to a second initial preamble received target power+a second preamble format-specific power offset+(the preamble power ramping counter−2)×a first power ramping factor+a second power ramping factor.

10. The apparatus according to claim 9, wherein the transceiver transmits a MsgA physical uplink shared channel associated with the first physical random access channel preamble in the 2-step random access procedure.

11. The apparatus according to claim 9, wherein the transceiver receives a 2-step random access channel configuration and a 4-step random access channel configuration.

12. The apparatus according to claim 11, wherein the 2-step random access channel configuration includes the first set of power control parameters and the 4-step random access channel configuration includes the second set of power control parameters.

13. The apparatus according to claim 11, wherein the 2-step random access channel configuration includes a first physical random access channel preamble format and the 4-step random access channel configuration includes a second physical random access channel preamble format, wherein the first transmission power is dependent on a first power offset corresponding to the first physical random access channel preamble format and the second transmission power is dependent on a second power offset corresponding to the second physical random access channel preamble format.

14. The apparatus according to claim 9, wherein:
   the first set of power control parameters comprise the first power ramping factor and a first initial preamble received target power; and
   the second set of power control parameters comprise the second power ramping factor and the second initial preamble received target power.

15. The apparatus according to claim 9, wherein the controller determines the second transmission power, $P_{PRACH,b,f,c}(i)$, for the subsequent second physical random access channel preamble transmission on an active uplink bandwidth part b of carrier f of serving cell c based on a downlink reference signal for the serving cell c in transmission occasion i as $$P_{PRACH,b,f,c}(i) = \min\{P_{CMAX,f,c}(i), P_{PRACH,target,f,c} + PL_{b,f,c}\} [\text{dBm}],$$

where $P_{CMAX,f,c}(i)$ is a user equipment configured maximum output power for the carrier f of the serving cell c within the transmission occasion i, where $P_{PRACH,target,f,c}$ is the second physical random access channel target reception power, which is provided by a higher layer for the active uplink bandwidth part b of the carrier f of the serving cell c, where the higher layer is higher than a physical layer, and where $PL_{b,f,c}$ is a pathloss for the active uplink bandwidth part b of the carrier f based on the downlink reference signal associated with the subsequent second physical random access channel preamble transmission, where the downlink reference signal is on an active downlink bandwidth part of the serving cell c and where the pathloss, $PL_{p,f,c}$, is calculated by the user equipment.

16. The apparatus according to claim 9, wherein the controller determines to switch from the 2-step random access procedure to the 4-step random access procedure based on performing a MsgA physical random access channel transmission in the 2-step random access procedure a threshold number of times without successfully receiving a MsgB random access response message in response to the MsgA physical random access channel transmission.

17. A processor for wireless communication, the processor comprising:
at least one controller coupled with at least one memory and configured to cause the processor to:
determine first transmission power for a first physical random access channel preamble in a 2-step random access procedure based on a first set of power control parameters;
transmit the first physical random access channel preamble in the 2-step random access procedure based on the first transmission power;
determine to switch from the 2-step random access procedure to a 4-step random access procedure;
determine, in response to determining to switch, second transmission power based on the first set of power control parameters and a second set of power control parameters for a subsequent second physical random access channel preamble transmission for the 4-step random access procedure;
transmit the subsequent second physical random access channel preamble transmission in the 4-step random access procedure based on the second transmission power;
increment a preamble power ramping counter by 1 before determining the second transmission power; and
set a second physical random access channel target reception power to a value equal to a second initial preamble received target power+a second preamble format-specific power offset+(the preamble power ramping counter−2)×a first power ramping factor+a second power ramping factor.

18. The processor according to claim 17, wherein the at least one controller is configured to cause the processor to transmit a MsgA physical uplink shared channel associated with the first physical random access channel preamble in the 2-step random access procedure.

19. The processor according to claim 17, wherein the at least one controller is configured to cause the processor to receive a 2-step random access channel configuration and a 4-step random access channel configuration.

20. The processor according to claim 19, wherein the 2-step random access channel configuration includes the first set of power control parameters and the 4-step random access channel configuration includes the second set of power control parameters.

* * * * *